(12) United States Patent
Brady

(10) Patent No.: US 7,170,641 B2
(45) Date of Patent: Jan. 30, 2007

(54) METHOD OF GENERATING MEDIUM RESOLUTION PROOFS FROM HIGH RESOLUTION IMAGE DATA

(75) Inventor: Thomas Brady, Methuen, MA (US)

(73) Assignee: Agfa Corporation, Wilmington, MA (US)

( * ) Notice: Subject to any disclaimer, the term of this patent is extended or adjusted under 35 U.S.C. 154(b) by 1019 days.

(21) Appl. No.: 10/082,284

(22) Filed: Feb. 26, 2002

(65) Prior Publication Data

US 2003/0043414 A1 Mar. 6, 2003

Related U.S. Application Data

(60) Provisional application No. 60/317,173, filed on Sep. 5, 2001.

(51) Int. Cl.
*H04N 1/405* (2006.01)
*G06K 15/00* (2006.01)
(52) U.S. Cl. .................... 358/3.06; 358/3.01; 358/3.08
(58) Field of Classification Search ............... 358/3.01, 358/3.06, 3.08, 534, 535, 536; 382/232, 382/233
See application file for complete search history.

(56) References Cited

U.S. PATENT DOCUMENTS

| | | | |
|---|---|---|---|
| 4,630,125 A | 12/1986 | Roetling | 358/280 |
| 4,907,096 A * | 3/1990 | Stansfield et al. | 358/3.08 |
| 4,987,496 A | 1/1991 | Greivenkamp, Jr. | 358/448 |
| 5,027,078 A | 6/1991 | Fan | 358/456 |
| 5,239,390 A | 8/1993 | Tai | 358/458 |
| 5,339,170 A | 8/1994 | Fan | 358/456 |
| 5,343,309 A | 8/1994 | Roetling | 358/455 |
| 5,384,648 A | 1/1995 | Seidner et al. | 358/534 |
| 6,101,285 A | 8/2000 | Fan | 382/260 |
| 6,172,769 B1 | 1/2001 | Rao et al. | 358/1.9 |
| 6,222,641 B1 | 4/2001 | Karidi | 358/1.9 |
| 6,252,676 B1 | 6/2001 | Azima et al. | 358/1.9 |

\* cited by examiner

*Primary Examiner*—Thomas D. Lee
(74) *Attorney, Agent, or Firm*—Robert A. Sabourin

(57) ABSTRACT

A method provides for determining an optimal sample dimension when descreening high-resolution image data so that a lower resolution image color proof may be created without suffering the problems typical of over sampling image data. The method allows to generate a single set of image data to create on-the-fly either a medium resolution color proof or a high resolution printed image without having to RIP the data twice, once for the proof, and once for the printed image.

25 Claims, 12 Drawing Sheets

FIG. 5A (grid of 0s and 1s with labels 130 and 134)

METHOD OF GENERATING MEDIUM RESOLUTION PROOFS FROM HIGH RESOLUTION IMAGE DATA

CROSS-REFERENCE TO RELATED APPLICATIONS

This application claims priority to and the benefit of U.S. provisional patent application Ser. No. 60/317,173 filed on Sep. 5, 2001, which is incorporated herein by reference.

TECHNICAL FIELD

The invention relates to the field of image processing in electronic prepress and imagesetting systems and, more particularly, to a method and apparatus for generating medium resolution proof images from high resolution image data.

BACKGROUND OF THE INVENTION

Halftone techniques have long been used to produce color images. The art of digital halftoning involves conversion of a contone image, in which image elements each have a color tone value, to a binary, or halftone representation, in which image elements are either "on" or "off." Color tone values become binary dot patterns that are intended to be averaged by the human eye and viewed as the desired color tone.

In digital imaging, halftoning usually involves using a threshold matrix or "mask" to simulate the classical optical screen, which is tiled to cover the whole page, or a dynamic error-diffusion procedure that averages the errors caused by the device limitations throughout the page.

The threshold matrix is an array of threshold values that spatially correspond to the addressable points on the output medium. At each location an input value is compared to a threshold to make the decision whether to print a dot or not. The matrix can be used on a large image by applying it periodically. Typically, this "screen" produces halftone dots that are arranged along parallel lines in two directions, i.e. at the vertices of a parallelogram tiling the plane with a given frequency and at a given angle.

Printing presses use plates to print ink onto paper and other media. One method used for creating plates is to expose photosensitive film with the matter to be printed. When the film is developed, the matter imaged on the film may be imaged onto a photosensitive plate, sometimes referred to as "burning" a plate. After processing, the plate can be used on a press to print the matter onto a medium. Part of the plate, usually the part defining the image to be printed, retains ink, while the other part of the plate does not. When the plate is introduced to ink and then to paper or other medium, the image is printed on the medium.

In a black and white printing job, there is usually one plate that is used to print black ink. In a color printing job, a different plate may be used for each color ink. A color job may use three colors of ink, usually cyan, magenta, and yellow, which in combination can be used to make other colors. A plate is usually produced for each color ink. Often, in addition to cyan, magenta, and yellow inks, black ink is also used. An additional plate is then required to print the black ink. Occasionally, one or more colors will be printed separately as well, referred to as a "spot color." That color will also have its own plate.

Electronic prepress systems have used an imagesetter to receive raster data associated with a plate and to image the raster data onto photosensitive film. In this context, a raster may specify an image by pixels in columns and rows. The film is then used to create a plate. The imagesetter exposes the photosensitive film pixel by pixel. One way that imagesetters image the raster data is to scan a laser across and down a piece of film. Electronics control the laser to expose, or refrain from exposing, each pixel in the raster data. The imagesetter images the pixels on the film in a manner that is precise and repeatable. Recently, platesetters also have been used to create plates directly from raster data without the use of intermediate film. Imagesetters, platesetters and like print engines, including proofers, are also referred to generally as output devices. In this context, imagesetters, platesetters and output devices used to image on material used to make a plate, for example on film and plate, are referred to as final output devices.

Print engines typically have been served by a dedicated raster image processor ("RIP") connected between the print engine and a "front end" computer running imaging application software. An example of such a front end computer is an Apple Macintosh™ running Quark Express™ imaging software. Other examples include, but are not limited to, Adobe Pagemaker™ and Luminous PressWise™ software. In a typical configuration, the Macintosh™ front end computer is connected to an Agfa Atlas™ RIP, which communicates with an Agfa Accuset™ imagesetter. The RIP interprets the graphic information transmitted to it by the front end, and converts the graphic information into raster data that can be imaged by the print engine. The raster data produced by the RIP typically depends on the capabilities of the imagesetter, such as the imaging resolution and the media type and media size loaded into the imagesetter.

In particular, the conversion of the contone image to a high-resolution halftone image using, for example, periodic halftoning mentioned above, is typically performed by the RIP. When an image file coded as a page description language is received by the RIP, operations performed by the RIP, such as using fonts to lay out text and using color processing to create raster data for each color, results in one or more raster data bit maps. The raster data produced by the RIP is usually binary, meaning that each pixel is either on or off, as distinguished from a contone raster data set, which includes at least one color level for each pixel. The raster data for each of the colors in a color image are referred to as color "separations." Each separation is transferred from the RIP to the output device over a high speed interface.

High-resolution color images are represented in separations. Each separation is imaged separately to the imagesetter or platesetter. The separations imaged by the output device are used to make printing plates (in the case of imagesetters) or are the printing plates themselves (in the case of platesetters).

When an output device images on film, it is possible to inspect the film before creating a plate. If the image on the film contains an error that may be observed by inspecting the film, such as misaligned, misplaced, or incorrectly included or excluded graphics, text, or colors, the error can be corrected, and a new film imaged. The corrected film may then be used to create the plate. When the output device images directly onto a plate, there is no intermediate film step. It is, therefore, not possible to observe the results of RIP processing until the plate is made.

Thus, when an output device outputs directly onto a plate, and often when imaging onto film, prior to generating the final image, it is helpful and, indeed, desirable to first produce a "preview" version of the image. Such simulations of the final, printed product, are known as "proofs." Proofs are typically used for customer printing contracts, for example, to secure customer's approval prior to creating the final product. Accordingly, proofs need to accurately represent the content, color separation, accuracy of imposition and other parameters of the image.

The quality of the preview image or proof, however, is limited by the quality of preview output devices. Preview output devices are commercially available, and are sometimes referred to as proof printers or proofers. These output devices generally accept page description language image files as input and produce images that integrate one or more separations onto a single sheet of paper or film. The proofer output, i.e. the proof, may resemble the final image output that will be produced by the press. The proof image may be used to verify text, graphics, and color layout. The effectiveness of the proof image is determined by the extent that the proof image resembles the final output.

One reason that a proof image may not resemble the final output is that the page description language interpreter (RIP) used by a proofer may interpret the same page description language differently than the RIP that provides raster data to the final output device. When the print job containing images coded in a page description language is received from the front-end by the RIP, the images are typically first RIP-processed for the proofer. Images generated for output to the proofer are typically contone images (meaning that each pixel has some color value) rather than binary separations. If the proof images are satisfactory, the images are then processed by the RIP again to a target high resolution output device in a pixel format. Thus, the RIP output for the proofer will typically be different than the RIP output generated for an imagesetter or platesetter. In this case, there may be significant differences between a final image and the proof image. For example, on the proof image there may be differences in the overlay of image elements resulting in text that may appear to be missing or covered by graphics, while this artifact may not be visible in the final image. As another example, text may appear to be properly placed on the proof image, but be incorrectly placed in the final image. Furthermore, this process is inefficient because multiple RIPs, multiple RIP setups, and additional RIP time and image quality assurance are required. Also, page images can also be received by the electronic prepress system in a pixel format such as, for example, TIFF. Jobs received in TIFF format have already been processed by the RIP at high resolutions.

Accordingly, it is desirable to generate proofs from the same set of high-resolution image data that is subsequently used to produce a final image, for example, RIP process the job for the high resolution output device, and then reuse the same image data to create the color proof without having to re-process by performing a second RIP operation.

High-resolution image data contains billions of 0's and 1's representing text characters, rules, filled shapes and halftone images. To generate a proof, it is necessary to restore the original color intensities (or ink densities) and obtain a contone equivalent of the halftoned image. This process is often referred to as descreening because it removes the screen that was applied while halftoning. Thus, in order to generate lower resolution continuous tone image, the billions of high-resolution image pixels must be sampled, analyzed and converted to lower resolution image pixels. The original object coded in the high-resolution pixels, however, may not be known. For example, it may be solid or a screened shade of gray. The halftoning process necessarily loses some image information in the conversion of the original continuous tone image to a halftone image. The reconversion of a halftone image to a continuous tone image, therefore, is essentially an estimation process because the halftoning process cannot be reversed exactly to reproduce a continuous tone image identical to the original image. Typical problems encountered while converting high resolution data to create lower resolution images include excessive contrast between gray levels, interference patterns, and/or resulting lower resolution images being blurred or too soft.

Descreening solutions known in the art are typically expensive in terms of processing time and computing resources. For example, known descreening methods require either multiple computational steps over the data, such as U.S. Pat. Nos. 5,343,309; 6,101,285; and 6,222,641, analysis of the source halftone image to determine filters or sampling parameters, such as U.S. Pat. Nos. 4,630,125; 5,027,078; and 6,172,769), or repetitive algorithms, such as U.S. Pat. No. 5,339,170.

U.S. Pat. No. 6,252,676 B1 to Azima et al. ("Azima '676") discloses a system for displaying an image on an output device includes a raster image processor for processing the description of the image in the page description language thereby creating a raster for each color separation associated with the image. The system of Azima '676 also includes a preproofer for selecting a subset of the raster data sets for proofing, and for descreening, resizing and combining each of the subset of raster data sets for proofing to create a page description language file including the descreened, resized, and combined each of the selected subset of the raster data sets for proofing, as well as a proofer for imaging the resulting page description language file. The descreening can be accomplished by averaging the pixels in the raster. The number of pixels to be averaged is determined by dividing the RIP-processed (input) raster resolution by the proof (output) raster resolution. For example, to convert a source image at 2400 dpi to a 600 dpi proof, the system such as that of Azima '676 can examine 4×4 pixel squares (because 2400/600=4) and map the number of pixels in the source image to a tone value so that each pixel of the 4×4 area is used for one output pixel of the proof image. While this method simultaneously accomplishes descreening and resizing and is particularly simple to compute, in the areas containing halftoned objects of variable tone value it may produce undesirable interference patterns and excessive contrast between gray levels.

SUMMARY OF THE INVENTION

Thus, it is an object of the present invention to provide an efficient method for sampling high resolution image data to create lower resolution color proofs having optimal contrast between gray levels and improved sharpness while substantially lacking interference patterns. It is another object of the present invention to provide a method for descreening and scaling high resolution image data in a single computational step thereby generating color proofs in real-time. It is yet another object of the present invention to provide a method, which would allow to generate a single set of image data to create on-the-fly either a medium resolution color proof or a high resolution printed image without having to process the data by the raster image processor twice, once for the proof, and once for the printed image.

In general, embodiments of the invention improve on those of U.S. Pat. No. 6,252,676 B1 to Azima et al., which is incorporated herein by reference, for example, with changes to the way that the high resolution image data is descreened. The improved descreening method is then used to generate a medium resolution proof. The method of the invention retains the benefits of Azima '676 with additional improvements in descreening of high resolution image data and associated improvement in efficiency of generating the proof and accuracy thereof.

Embodiments of the invention focus on the descreening portion of color proof preparation, and provide inexpensive solutions to the disadvantages of current descreening methods. More particularly, embodiments of the invention enable a one-pass conversion to descreen and scale 1 bit/sample high resolution image data to 8 bit/sample medium resolution image data. High resolution image data may be generated using screening technologies that result in images having a resolution between 1200 and 4000 pixels/inch. Examples of such technologies include Agfa Balanced Screenings and Agfa CristalRaster® available from Agfa Corporation of Wilmington, Mass. Typical proof image resolution is between 300–720 pixels/inch. Scaling is based upon the ratio of the source resolution to that of the target proof resolution. Descreening sampling is based upon a sample dimension derived beforehand with knowledge of the screen applied to create the high resolution image.

Accordingly, an embodiment of a method for generating medium resolution color proofs from high resolution image data determines an "optimal" sample dimension when sampling high resolution image data. Here, the term "optimal" is used to mean approximately or roughly optimal, considering the implementation and other factors. The optimal sample dimension is then used to descreen the high resolution image data in order to create a medium resolution color proof on a proofer or other output device used in the graphic arts industry in real-time.

The sample dimension according to an embodiment of the present invention is based on the screen characteristics used to create the halftone data and is selected to center on the source pixel with the closest linear coordinates as those of the output pixel. In order to create lower resolution color proofs having optimal contrast between gray levels and improved sharpness while substantially lacking interference patterns, the method for determining the optimal sample dimension varies depending upon the density of the line screen used to convert the original contone image to a high-resolution halftone image. As used herein, the term "halftone image" means a binary representation of a original contone image, in which image elements are either "on" or "off."

Color tone values become binary dot patterns that are intended to be averaged by the human eye and viewed as the desired color tone. A halftone image may include graphic objects of variable tone value, as well as solid objects, such as text. The method of the invention can be used to generate proofs from images generated with either traditional halftone screens or stochastic screens.

In general, in one aspect, the invention features a method for determining an optimal sample dimension suitable for descreening and rescaling the raster data of a halftone image, which was converted from an original contone image using a periodic screen. The method comprises obtaining parameters of the periodic screen, including a line density, a cell dimension, and a screen angle; and modifying the cell dimension depending upon the line density and the screen angle of the periodic screen thereby calculating the optimal sample dimension suitable for descreening of the halftone image. The method of the invention may also include storing the optimal sample dimension. Further, the method of the invention may include descreening and rescaling raster data using the calculated optimal sample dimension.

The step of modifying the cell dimension in order to calculate an optimal sample dimension can include performing a first calculation, which consists of multiplying the cell dimension by a first coefficient. This step further can include performing a second calculation, which consists of multiplying the result of the first calculation by a second coefficient, and also performing a third calculation comprising raising the result of the second calculation to the second power. The step of modifying the cell dimension further includes performing a fourth calculation comprising multiplying the result of the second calculation by a third coefficient; and rounding the result of the fourth calculation to the nearest integer.

The value of the first, second and third coefficients depends upon the density of line screen and the screen angle. In one embodiment, each of the coefficients equals 1. In another embodiment, the first coefficient and the second coefficient equal 1, and the third coefficient equals 2. In yet another embodiment, the first coefficient equals a square root of 2, and each of the second coefficient and the third coefficient equals 1.

In still another embodiment, the first coefficient equals 1 and the second coefficient comprise the smallest integer selected such that the result of the third calculation exceeds a predetermined number. In one version of this embodiment, the predetermined number is at least 100, for example, equals 128. In this embodiment, the third coefficient may equal 1 or 2. Finally, in yet another embodiment, the first coefficient equals a square root of 2, the second coefficient comprises the smallest integer selected such that the result of said third calculation exceeds a predetermined number, and the third coefficient equals 1. In one version of this embodiment, the predetermined number is at least 100, for example, equals 128.

In general, in another aspect, the invention features a method for generating a descreened contone proof image that accurately reflects the layout of a halftone image converted from an original contone image using a high- or medium-density periodic screen. The method according to this aspect of the invention includes receiving at a print drive from at least one raster image processor the raster data of the halftone image processed by the at least one raster image processor. The print drive includes a job control system for receiving, storing, digitally combining, and initiating output of raster data, and a user interface for directing operation of the job control system by a system operator. The method further includes determining an optimal screen-based sample dimension suitable for descreening and rescaling the raster data of the halftone image.

The step of determining an optimal screen-based sample dimension comprises obtaining parameters of the periodic screen, including a cell dimension and a screen angle; and modifying the cell dimension depending upon the screen angle thereby calculating the optimal screen-based sample dimension. The method for generating a descreened contone proof image further includes descreening and rescaling the raster data using the optimal screen-based sample dimension to form a descreened proof raster data of the halftone image; and imaging the descreened proof raster data on a proofer. In one embodiment of this aspect of the invention, the step of imaging the descreened proof raster data on a proofer includes the steps of wrapping the descreened proof raster data in a page description language wrapper; and transmitting the descreened proof raster data wrapped in the page description language wrapper to the proofer.

In general, in yet another aspect, the invention is directed towards a method for generating a descreened contone proof image that accurately reflects the layout of a halftone image converted from an original contone image using a low-density periodic screen. The method includes the steps of processing the original contone image to create a plurality of raster data sets representing sets of objects of the halftone image and receiving at a print drive from at least one raster image processor the first raster data of a first set of objects of the halftone image processed by the at least one raster image processor. The method further includes receiving the second raster data of a second set of objects of the halftone image processed by the at least one raster image processor. The first set of objects may represent at least one variable-color object of the original contone image. The second set of objects may represent at least one solid-color object of the original contone image. The method also includes facilitating selection of the first raster data and the second raster data via the user interface. The method further comprises determining an optimal screen-based sample dimension suitable for descreening and rescaling of the first raster data and determining an optimal resolution-based sample dimension suitable for descreening and resealing of the second raster data.

The step of determining an optimal screen-based sample dimension may include obtaining parameters of the periodic screen including a cell dimension and a screen angle; and modifying the cell dimension in response to the screen angle. The step of determining an optimal resolution-based sample dimension may include obtaining the resolution value of the halftone image, providing the resolution value of the descreened contone proof image; and rounding the resultant ratio of the resolution value of the halftone image to the resolution value of the descreened contone proof image to the nearest integer.

The method for generating a descreened contone proof image according to this aspect of the invention further includes descreening and rescaling the first raster data using the optimal screen-based sample dimension to form a first descreened proof raster data of the first color separation; and also descreening and rescaling the second raster data using the optimal resolution-based sample dimension to form a second descreened proof raster data of the second color separation. The method then comprises digitally combining, by the print drive in response to direction received via said user interface, the first descreened proof raster data and the second descreened proof raster data to form combined proof raster data representing a resultant proof image; and imaging the combined proof raster data on a proofer.

In yet another aspect, the invention generally features a prepress system for generating a descreened contone proof image that accurately reflects the layout of a halftone image converted from an original contone image using a periodic screen. The prepress system of the invention includes a front end having an imaging application for creating a contone image having one or more separations and for forming a description of the contone image in a page description language. The prepress system also includes at least one raster image processor for processing the description of the contone image in the page description language thereby converting the contone image into the halftone image by creating raster data sets for each color separation associated with the halftone image. The prepress system further includes a print drive for controlling operations therein. The print drive comprises a print drive input terminal receiving, from the at least one raster image processor, the raster data for each color separation associated with the halftone image; a job control system for receiving, storing, digitally combining, and initiating output of raster data, a user interface for directing operation of the job control system by a system operator; a preproofer for determining an optimal sample dimension for at least one of the raster data sets and for descreening, rescaling, resizing, and combining the at least one of the raster data sets using the optimal sample dimension to create a proofer raster data set; and a proofer for imaging the proofer raster data set. The preproofer may be capable of wrapping the proof raster data set in a page description language wrapper; and transmitting the proof raster data set wrapped in the page description language wrapper to the proofer.

In one embodiment of this aspect of the invention, the print drive further comprises a digital doubleburner in electrical communication with the print drive input terminal and the preproofer. The digital doubleburner is capable of combining descreened proof raster data sets to form combined proof raster data representing a resultant proof image.

BRIEF DESCRIPTION OF THE DRAWINGS

The following description may be further understood with reference to the accompanying drawings. In the drawings, like reference characters generally refer to the same parts throughout the different views. Also, the drawings are not necessarily to scale, emphasis instead generally being placed upon illustrating the principles of the invention.

FIG. 5A is a bit map in an embodiment of the descreening step shown in FIG. 3.

DETAILED DESCRIPTION OF THE PREFERRED EMBODIMENTS

Figure 1:
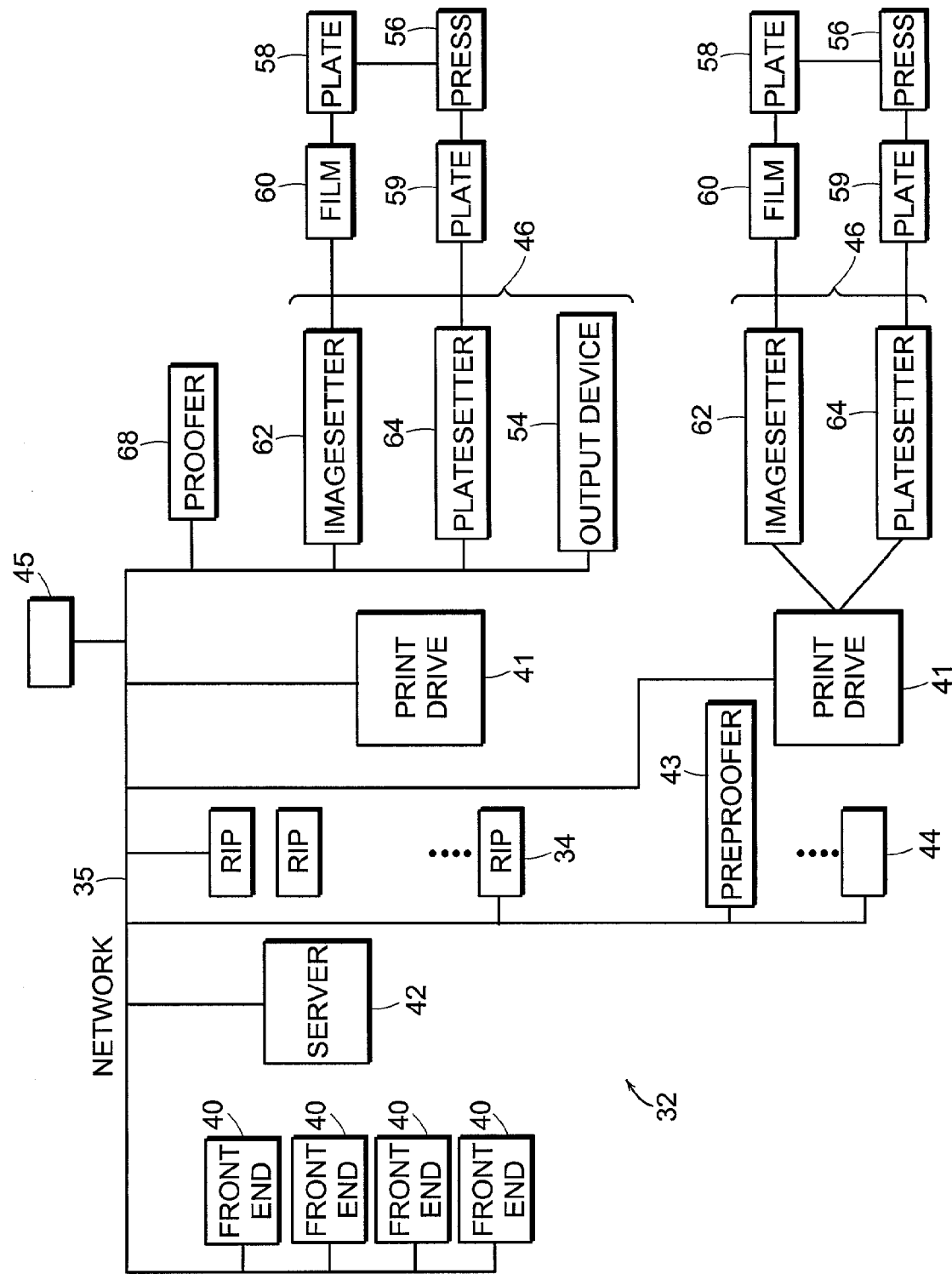
FIG. 1 is a block diagram of an embodiment of a prepress imaging system according to the present invention.

Referring to FIG. 1, a prepress system, generally referred to by reference numeral 32, includes one or more computers that are referred to as front ends 40. The front ends 40 are connected to computer network 35. The front ends 40 are used for creating, editing, or otherwise preparing image data for printing. Both color and black and white images are prepared on the front ends 40 for processing by the prepress system and eventual image reproduction by a printing press 56 using a printing plate 58. Traditionally, the printing press 56 was not considered part of the prepress system 32, however, recent advances have resulted in platesetters (described below) that are built into, or components of printing presses. The front ends 40 can be commercially available computers, for example including, but not limited to computers having operating systems such as Windows NT™., Mac OS™., or a version of UNIX™. The front ends 40 have imaging application software such as QuarkXpress™, available from Quark, Inc. of Denver, Colo., and Adobe Pagemaker™, available from Adobe Systems, Inc. of San Jose, Calif.

The front ends 40 may also have imposition software used to lay out pages within an image, such as Scenic Soft Preps™ available from ScenicSoft, Inc of Lynnwood, Wash., or Impostrip™, available from Ultimate Technographics of Montreal, Canada. Impositioning software positions one or more pages within an image, so that multiple pages are presented in a single image. Having multiple pages imaged on a single plate increases productivity, because multiple pages are printed at the same time. The imaging application software and the imposition software both produce images coded in a page description language. The front ends 40 can output images coded in a page description language directly to raster image processors ("RIPs") 34 via the network 35. The front ends 40 can also output images to an image server 42 via the network 35.

The network 35 can be any of the various types of commercially available computer networks, but must be of sufficient capacity to handle the traffic generated by the prepress system. In one embodiment, the network is a Fast Ethernet network, including a 100baseT Hub and appropriate connections between the networked components and the hub.

In one embodiment, the image server 42 receives images output from the front ends 40 and stores them on the system. The image server 42 can queue jobs for immediate transmission to one of the RIPs 34 when a RIP 34 becomes available. The image server 42 can also store images from the front ends 40 for later processing by RIPs 34. The image server 42 helps improve workflow efficiency by allowing front end users to output their jobs even if the RIPs 34 are busy. By queuing a job for the RIP 34 on the image server 42, the RIP 34 can be kept continuously busy.

The RIPs 34 may be software RIPs operating on a computer system, which may be one of the front ends 40, or on a server class computer system. Such software RIPs include the, Agfa Apogee PDF RIP™ software, Agfa Viper™ software RIP and the Agfa Taipan™ software RIP all available from Agfa Corporation of Wilmington, Mass. The RIPs 34 may also be dedicated hardware RIPs, such as the AgfaStar™ hardware RIP, also available from Agfa Corporation. Each RIP 34 has a software and/or hardware RIP module for RIP functions such as screening, trapping, imposition, page or image combination, color separating, and/or color management of image data.

The RIPs 34 each include an input network interface module over which text page description language or other types of input image files are received from the front ends 40 or the image server 42. Each RIP 34 thus appears on the network and can be accessed by any front end 40 or the image server 42 or other computer system on the network 35. The input network interface module may also serve as an output network interface module so that a single network interface connection connects each RIP 34 to the network 35. In another embodiment, a separate network connection connects each RIP 34 to a print drive 41 to maximize system performance.

A print drive 41 includes a plurality of software modules operating on a standard computer platform configured for efficient print drive functions. The print drive hardware may also include a number of interface boards or modules including a fast network interface and hardware connection to an output device 46 such as an imagesetter 62 or platesetter 64. The print drive 41 receives raster data that is output from RIPs 34, and stores the images for output by output devices 46. As described further below, in addition to storing rasterized page images, the print drive is capable of combining portions of an image into one image. The print drive 41 maybe connected to the RIPs 34 via the network 35, or may have individual connections to the RIPs. The print drive 41 may include a job control system for receiving, storing, digitally combining, and initiating output of raster data, and a user interface for directing operation of the job control system by a system operator. The print drive 41 may be directly connected to the output devices 46, as shown in the embodiment of FIG. 1, or it may connect with the output devices via network 35, or via other connections. The final output devices 46 include imagesetters 62 and platesetters 64. Output devices can also include a proofer 68, and printers and plotters 54, and such other output devices used in the industry.

The imagesetter 62 images on photosensitive film or paper. The photosensitive film 60 is used to make at least one plate 58. A plate 58 is used on press 56 to print one color of an image. On a black and white image, only one color, black, is usually necessary. For a color image, generally at least the three "process" colors, cyan, magenta, and yellow, and often a fourth color, black, are used. These colors are sometimes referred to as "CMYK." One or more "spot colors," which refers to an additional color, may be used as well. The imagesetter 62 images the raster data for each color onto film, and the film is used to make a plate 58. The plates are then used on the press to print high quality printed material, often in large quantities. This result of the electronic prepress printing process may be referred to as the final image. Examples of imagesetters are the Selectset Avantra™ the SelectSet 7000™, and the AccuSet Plus™ imagesetters, all available from Agfa Corporation of Wilmington, Mass.

The platesetter 64 images directly onto a plate 59, without the use of film 60. By use of a platesetter 64, the step of creating a plate 58 by using film 60 is eliminated. This can improve the workflow, because it eliminates a step, and also eliminates the material cost of film 60. Examples of platesetters are the Agfa Galileo™ platesetter and the Agfa Polaris 100™ digital platesetting system, available from Agfa Corporation of Wilmington, Mass. As mentioned above, there are some presses now available that incorporate platesetter functionality.

The proofer 68 is an output device that outputs proof images or "proofs". When an output device outputs directly onto plate, and often when imaging onto film, prior to generating the final image, it is helpful and indeed desirable to first image a "preview" version of the image. These printed simulations of the final, printed product, are known as proofs. Proofs are typically used for customer printing contracts, for example, to secure customer's approval prior to creating the final product. Accordingly, proofs need to accurately represent the content, color separation, accuracy of imposition and other parameters of the image. An example of a proofer is the Agfa DuoProof Utra™ available from Agfa Corporation of Wilmington, Mass. A proofer can image onto plain paper or other media, and may use techniques including, but not limited to, toner dispersion, thermal wax transfer, and dye sublimation. The proofer 68 may output monochrome images and/or color images. Color images may be imaged using process colors, which are three or four colors that are combined to produce a color image. The proofer 68 may have any line ruling and resolution, although generally the resolution is less than the resolution of the final image. For example, a final image may be imaged by a final output device at 3600 dpi, while the maximum resolution of the proofer 68 may be 600 dpi.

A preproofer 43 converts RIP processed raster data into data that can be displayed by proofer 68. In one embodiment, preproofer 43 is software that runs on a general purpose computer, such as a server class computer running such operating systems as Windows NT™, MacOS™, or a version of UNIX. In another embodiment, preproofer software is included on the same system as a front end 40, a RIP 34, or a print drive 41. If the preproofer is software residing on a front end 40, a RIP 34, or a print drive 41, the system must be of sufficient capacity to handle the added functionality. In another embodiment, the preproofer 43 is a dedicated hardware platform. Typically, however, the preproofer is part of the print drive 41. This is the case, for example, in the Agfa Apogee Print Drive Series 3, available from Agfa Corporation, Wilmington, Mass., which includes both preproofing and print drive functionality.

Figure 2:
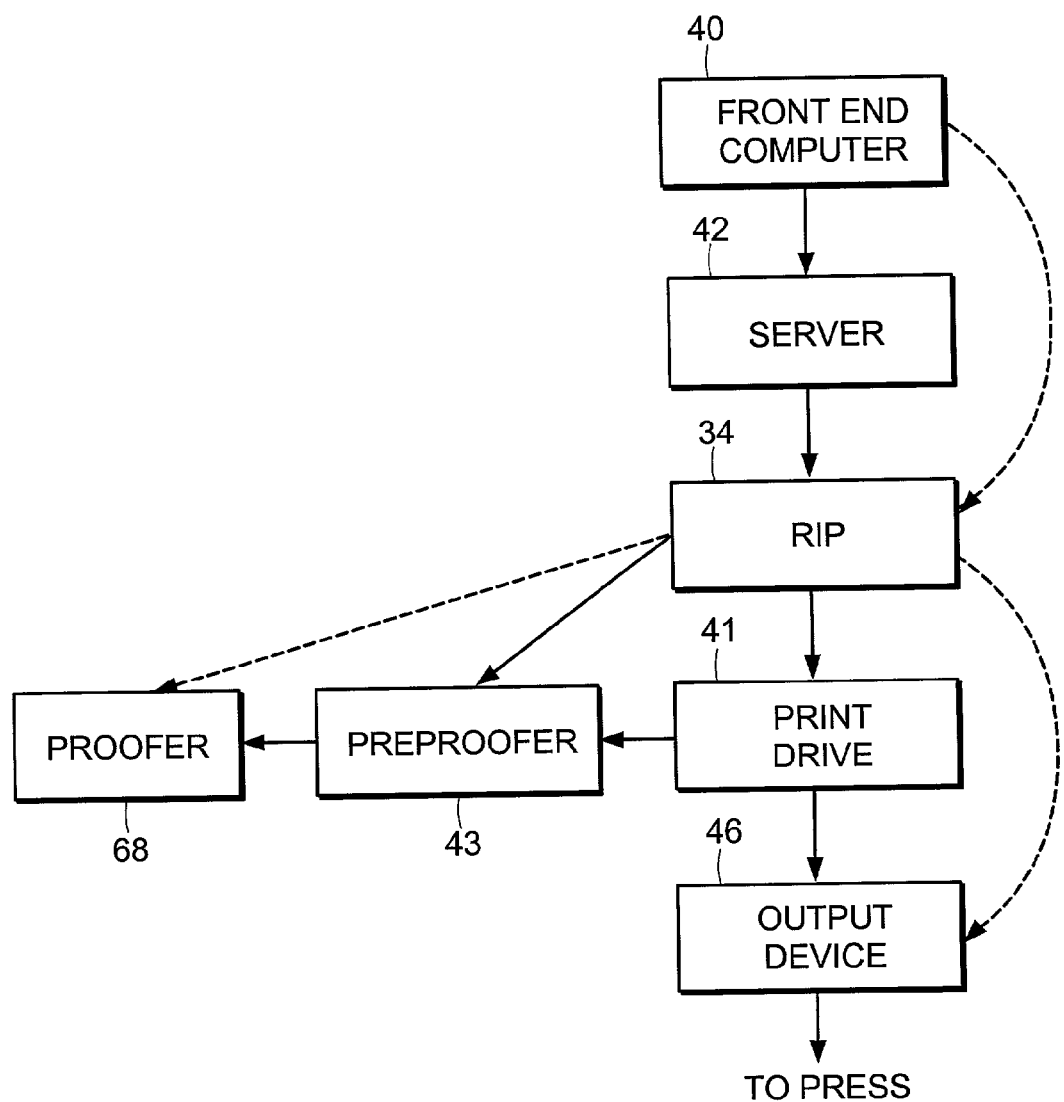
FIG. 2 is a flowchart of an embodiment of the workflow of a job in the prepress imaging system of FIG. 1.

Referring to FIG. 2, the work flow through the system of FIG. 1 begins with the front end 40. The image is designed using an imaging application. The image may be a composite of text and graphics derived from many possible sources. The image may be impositioned on the front end 40, meaning that a number of pages are placed and laid out in the image. The front end 40 may queue the image for processing by sending the job to the image server 42. Alternatively, the front end 40 may output the job directly to a RIP 34. Use of an image server 42 provides the system operator with more constant utilization of the front end 40 and the RIP 34 because neither the front end 40 nor the RIP 34 wait for the other. The image is transmitted to the RIP 34 by either the front end 40 or the image server 42. The image is then processed by the RIP 34. The RIP 34 outputs raster data that results from RIP processing either directly to the output device 46 or to the print drive 41. The print drive 41 stores the raster data until it is ready to be imaged on an output device 46. When the raster data is to be imaged on the output device 46, the print drive 41 transmits the raster data to the output device 46. The output device may image onto film, which is then used to make a plate, or the output device may image onto plate. Plates are used on a press to make the final image.

The proofer 68 may accept bitmap raster data sets, but may also accept, or may only accept contone images in which a greylevel or color level of each pixel is specified. Generally, the proofer 68 will have the capability of interpreting page description language, or may have an associated hardware or software RIP to process page description language sent to the proofer 68. The associated RIP may be the same RIP 34 used for image processing as above, or may be a different RIP, for example, a RIP that is a component of the proofer 68. The proofer 68 may accept raster files when they are "wrapped" in a page description language header and footer if the page description language includes a mechanism to include raster files. The wrapper of page description language before the raster data set and after the raster data set is sufficient to allow the proofer 68 to process the raster data set.

In what is sometimes referred to as contract proof workflow, the proofer 68 is used to preview the image as it is processed by RIP 34. An image is sent, in page description language format, from the front end 40 or the image server 42 to the RIP 34. The image is prepared by the RIP 34 to meet the input requirements of the proofer 68 with regard to image size and resolution, and also to maximize the output capabilities of the proofer 68. The final output device 46 may not even be determined at the time the image is sent to the proofer 68, and so the characteristics of the final output device 46 are not reflected in the contract proof. Rather, the output characteristics of the proofer 68 are used to create the RIP output.

The contract proof workflow allows the image to be processed by the same RIP 34 as will later process the image for the final output device 46. The use of the same RIP 34 as will be used later to produce raster data sets for the final output device 46 eliminates some artifacts that result from the use of different RIPs to create the proof and the final image. The same RIP 46 should interpret the same page description language code in a similar way, even for different output devices. In this workflow, the page description language interpreter normally used by the proofer 68 is bypassed. In one embodiment, contone raster data generated by the RIP 34 is sent to the proofer 68 directly, either in the form of an image data set (for example, TIFF file) accepted by the proofer 68, or in the form of a page description language wrapper around the image data set. The image data sent to the proofer 68 is in the form of a raster data set specifying the image.

It is possible that the differences in the output characteristics of the proofer 68 and the final output device 46 may lead to image artifacts and other differences between the proof image and the final image. The proof image may be the best quality image that the proofer 68 can deliver, but if it has significant differences from the final image, then its usefulness as a proof is limited.

In an alternative to the contract proof workflow, sometimes referred to as imposition workflow, the actual raster produced by the RIP 34 for the final output device 46 is used to image on the proofer 68. It is generally not possible for the proofer 68 to directly use the RIP 34 output intended for the final output device 46 because it is formatted in size and resolution for the final output device 46. The proofer 68 generally requires that colors be specified in one file rather than in separate raster data sets.

In one embodiment, the proofer 68 is driven by the output of the RIP 34 after the raster data sets are converted by the preproofer 43. In this case the image is RIP processed into raster data for output to the output device 46, a process that produces one or more raster data sets each having characteristics of the final output device. For example, in one embodiment, the raster data sets have the size, resolution, and screen ruling associated with the output device 46. The raster data sets are each separations of the same image, with each separation associated with one color of the image. These raster data sets are binary files. It will most likely not be possible to image these raster data sets directly on the proofer 68. Thus, to image the raster data sets created for the output device 46 on the proofer 68, the raster data sets need to have their size and resolution adjusted to image at a different resolution. The raster data sets also need to be descreened to convert them from the binary to contone.

It is possible in some cases that the quality of the image as it is output by the proofer 68 may not be as high quality as the contract proof. This is because the image will have been converted from a high resolution raster to a lower resolution image. Descreening may produce imaging artifacts. Nevertheless, the image may more accurately reflect the layout of the final image than the contract proof, since the actual final output raster data is used to produce the contone image.

Figure 3:
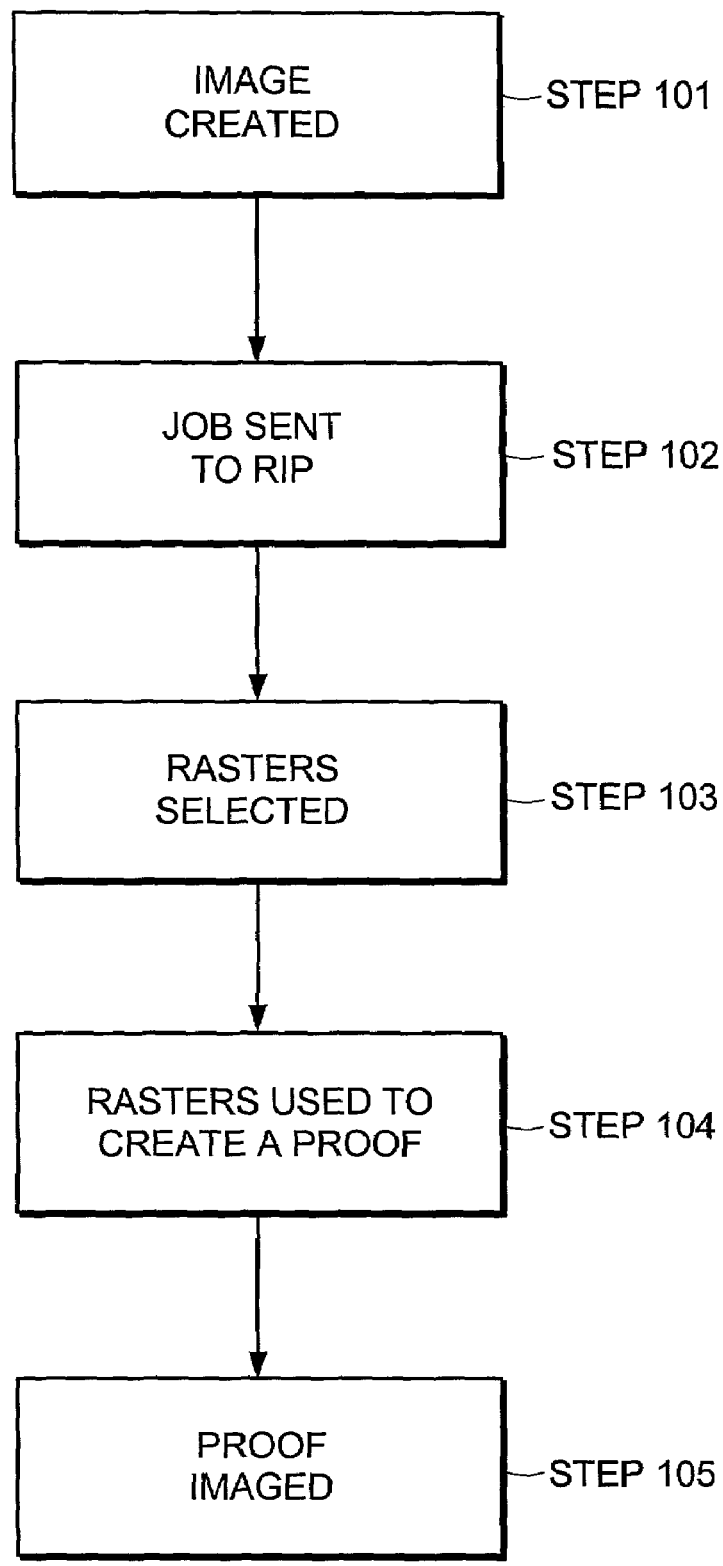
FIG. 3 is a flowchart of an embodiment of the invention using the imaging system of FIG. 1.

Referring to FIG. 3, an image is created in an imaging application (STEP 101). The image is then sent to a RIP (STEP 102). In one embodiment, this is accomplished by printing from the application to the RIP 34, which transmits page description language from the imaging application to the RIP 34. The image is processed by the RIP 34, and the result of RIP processing is raster data representing an original contone image converted to a halftone image. There may be one or more raster data sets, depending on the number of separations in the original image. Once the raster data sets are produced, they are stored on the RIP 34. In another embodiment, the raster data sets are transferred to print drive 41. In another embodiment, the images are first sent to an image server 42.

In the next step, one or more of the raster data sets are selected for imposition proofing (STEP 103). In one embodiment, the system operator selects one or more of the raster data sets. For example, the system operator may select all of the raster data sets associated with an image. As another example, the system operator may select only some subset of the color separations for an image. In another embodiment, the images are automatically selected for proofing by the system based on a predetermined criteria. For example, the print drive 41 may be configured to always image a proof when an image is sent to print drive 41. The selected raster data sets are then used to create a proof image (STEP 104). The proof image may be in one of several different formats, including but not limited to raster format, TIFF format, or a page description language.

The proof image is then imaged on the proofer (STEP 105). In one embodiment, the proofer accepts raster data sets, and the raster data set is sent directly to the proofer. In another embodiment, the proofer accepts TIFF files, and a TIFF file is sent directly to the proofer. In yet another embodiment, the proofer accepts only page description language files, including page description language files that include a TIFF file, and so a page description language file is sent that comprises a TIFF file with a page description language wrapper. The wrapper is sufficient page description language for the proofer to accept the TIFF file. In another embodiment, the RIP output is made available to an imaging application, and the imaging application constructs a page containing the RIP output. For example, in one embodiment, the RIP output is a TIFF file, and the imaging application constructs a page containing the TIFF file. This imaging file in page description language output from the imaging application is then sent to the proofer.

Figure 4:
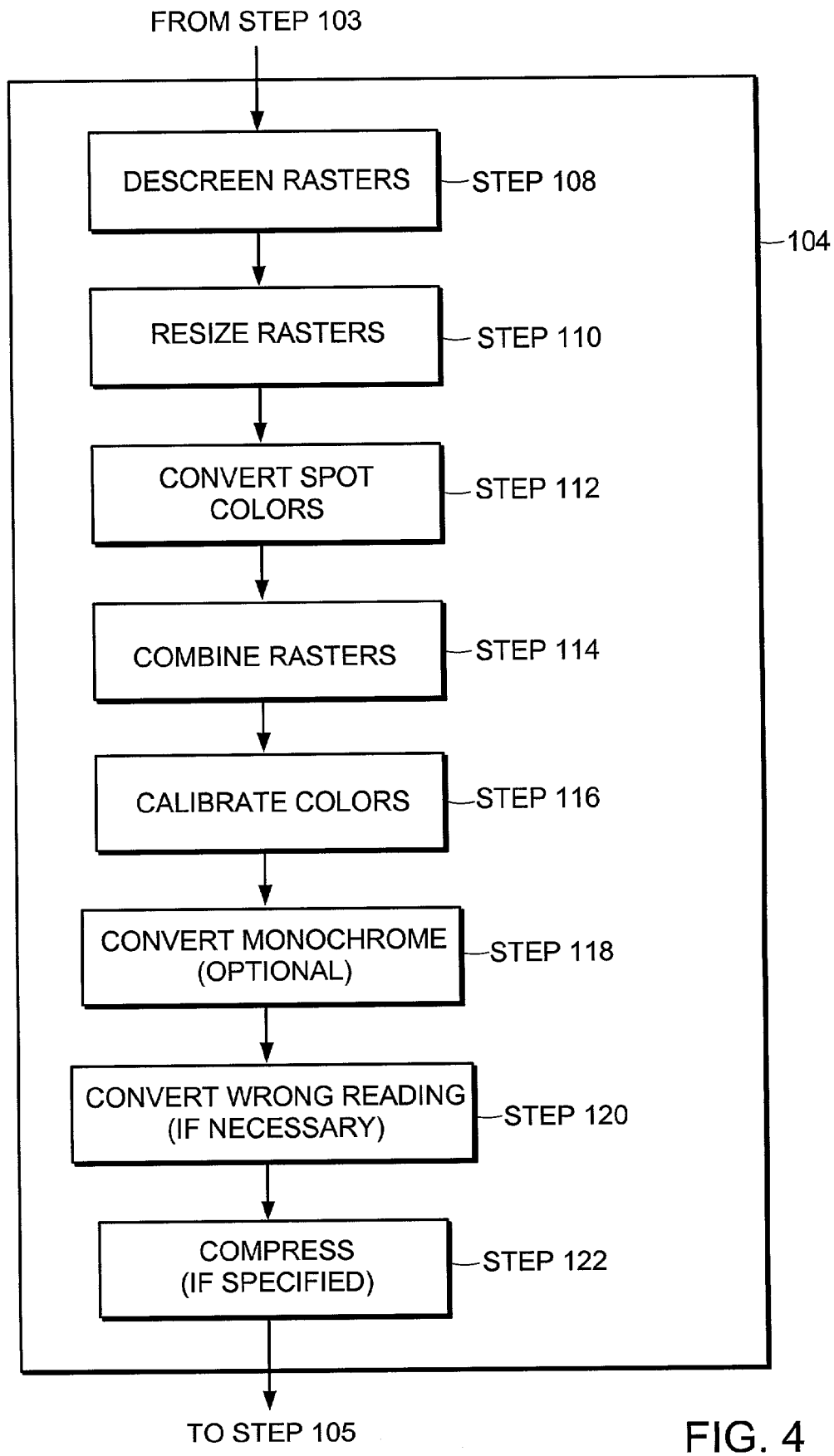
FIG. 4 is a flowchart of an embodiment of the step of using the raster data sets to create a proof of FIG. 3.

Referring to FIG. 4, the process of creating a proof image from the raster data sets involves several steps. The order shown in FIG. 4 is not necessary to the invention, and the steps may be ordered differently. Some steps may be omitted if not necessary in a particular implementation. In one embodiment, the raster data sets are descreened or converted into color levels (STEP 108), as described below. This is particularly useful for binary raster data sets. Screening simulates shades of color by grouping pixels in a particular order and shape. The descreening process converts the shaped groupings back into color levels. The result of descreening is an attribution of a color level for each pixel. Various techniques of descreening are encompassed by the invention. In one embodiment, the raster data sets are descreened by averaging the pixels surrounding the pixel to be descreened, as described in more detail below.

In the next step, the raster data sets are resized (STEP 110). This step includes changing the resolution of the image. This step is necessary when the resolution of the proofer is different than the resolution of the output device. This step may be accomplished as part of the descreening step 108. For example, if the raster data sets are descreened by averaging the pixels, the raster data sets may be resized with the same calculation.

In the next step, spot colors are converted to process colors (STEP 112). Typically, a proofer does not have the capability of printing a spot color, because it will not have a special ink for a particular color. In general, a color may be simulated by some combination of process colors. In one embodiment, the conversion of spot colors to available colors is accomplished by a lookup table.

Raster data sets for different color separations are combined into a single raster (STEP 114). This is accomplished by merging the raster data sets for each color into one data set. The descreened, resized raster data sets have a color level for each pixel. That color level is copied onto the merger data set. Color levels may be normalized. Spot colors may also be included by assigning the spot color process color values.

The colors may be calibrated to match the colors produced by the press (STEP 116). In one embodiment, this calibration is accomplished with a lookup table. In another embodiment, this is accomplished by use of a mathematical function based on a calibration equation. The equation maps the proofer colors to the colors produced by the press.

If the user desires a monochrome proof, the raster may be converted to monochrome (STEP 118). If the file is "wrong-reading," meaning the direction is inverted, the direction may be corrected (STEP 120). If compression is enabled, the image data may be compressed (STEP 122). In one embodiment, the image data is compressed with Lempel-Ziv-Welch (LZW) compression, which reduces the amount of data required to be transmitted. In one embodiment, whether or not these steps are required is determined by the configuration of the system. In one embodiment, information about the files may be included with the file data. In another embodiment, file information is stored in a separated location. In one embodiment, the preproofing capability is configured to consult information about the file before determining which steps are to be performed.

Figure 5A:
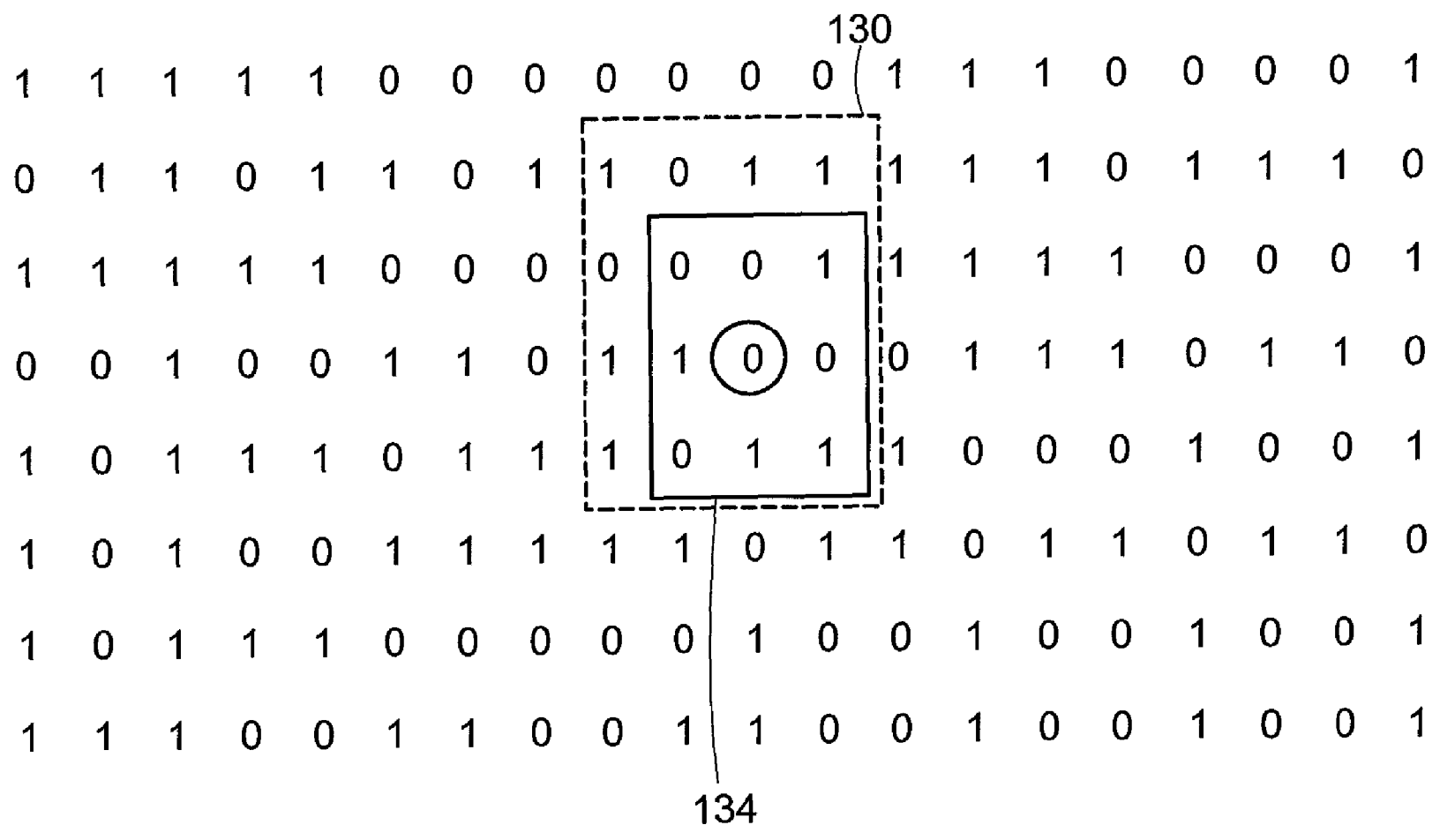

Referring to FIG. 5A, in one embodiment, the descreening step (STEP 108) and the resizing step (STEP 110) are accomplished by averaging the pixels in the raster data set. In FIG. 5A, the example pixel to be converted is circled. In one embodiment, the number of pixels that are averaged is determined by the RIP processed (input) raster resolution and the proof (output) raster resolution. The input raster resolution is divided by the output raster resolution to determine the number of pixels to be averaged. For example, if the input raster resolution is 2400 dpi, and the output raster resolution is 600 dpi, then the output will be ¼ of the input. The averaging process will average (4×4=16) sixteen pixels to determine a particular output pixel. There is a 4×4 box drawn around the sixteen pixels 130 that are averaged to determine the value of that pixel. Such 4×4 pixel squares in the source image are examined and the number of "one" pixels in the source image (0–16) is mapped to a value between 0–255. Each pixel of the 4×4 area is used for only 1 output pixel in the proof image. Similarly, if the output raster were to be, for example, 1200 dpi, the averaging process would average (2×2=4) four pixels 134.

Figure 5B:
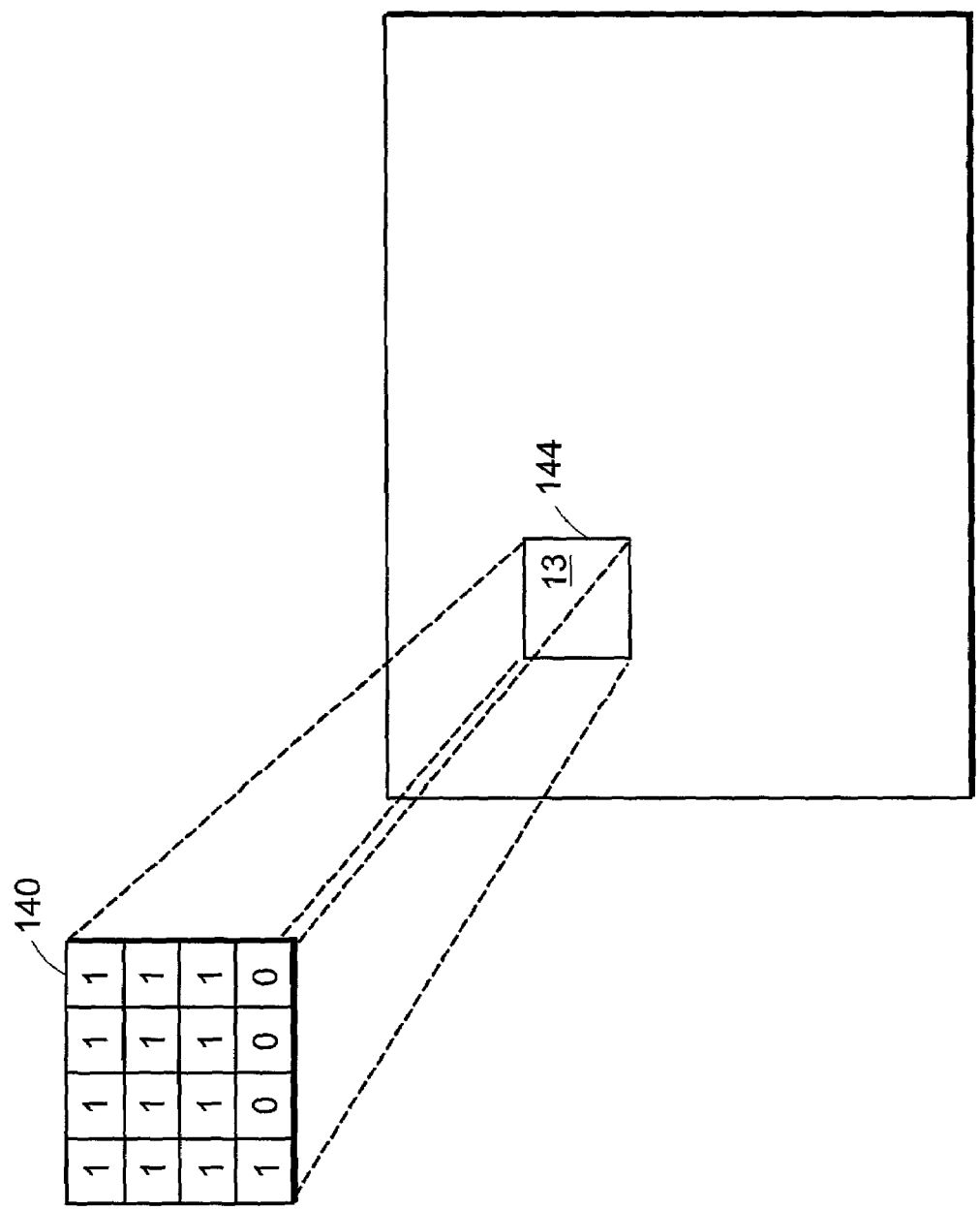
FIG. 5B is a mapping of a raster to a descreened image in an embodiment of the descreening step of FIG. 5A.

Referring to FIG. 5B, a 4×4 group of sixteen pixels 140 in the input raster maps to one pixel 144 in the output raster. In the embodiment shown in FIG. 5B, the total of the sixteen pixels equals 13. The output pixel 144 is shown with the sum value of 13. If the averaging embodiment were used, the output pixel would have the value 13/16. Other methods of descreening and other methods of averaging may be used and are within the scope of the invention. This method has the advantage of being particularly simple to compute, and simultaneously accomplishes descreening and resizing, so it is relatively efficient, and can be accomplished relatively quickly, even on very large images. This method gets a little more complicated, however, when converting from, for example, 2400 dpi source resolution to 720 dpi proof resolution. The same sample-once rule holds, but possible sample areas may be 3×3, 3×4, 4×3 or 4×4, because the ratio of 2400/720=3.33333, a non-integer value.

This resolution-based descreening technique is useful to descreen and rescale solid objects such as text, rules and solid shapes. In the areas of the source image containing halftone objects of variable tone value, however, this technique may produce undesirable interference patterns and excessive contrast between gray levels. Merely increasing the sample area may increase the number of gray levels per output pixel thus lowering contrast between gray levels, but may at the same time aggravate the interference patterns.

Accordingly, in another embodiment, high resolution image data is sampled for lower resolution output by selecting a sample dimension based on the screen characteristics used to create the halftone data. The sample area is selected to "center" on the source pixel with the closest linear coordinates as those of the output pixel. Source pixels will are sampled for multiple output pixels.

In such an embodiment, different approaches can be used at the edges of the image. For example, samples that would otherwise be taken from pixels outside the image area are just taken from the last row or column. For example, if the source row ordinate is less than 0, the samples are taken from row 0. In another approach, if a sample requires pixels to the right or left, or the top or bottom, of the source image, the sample area is moved toward the center so the sample area falls within the source image. A combination of these or other approaches can be used.

As described above, images are typically created, edited, and combined into a single image file on the front end computer running the imaging and imposition software. Such a single image, often referred to as a "print job," is then processed by the prepress system for final output. Each print job is typically identified by the elements of the prepress system, such as the RIP, by a job description, which may include the job name and a list of image files that made up the job. Job descriptions are communicated from one element of the prepress system to another during the prepress image processing.

Figure 6:
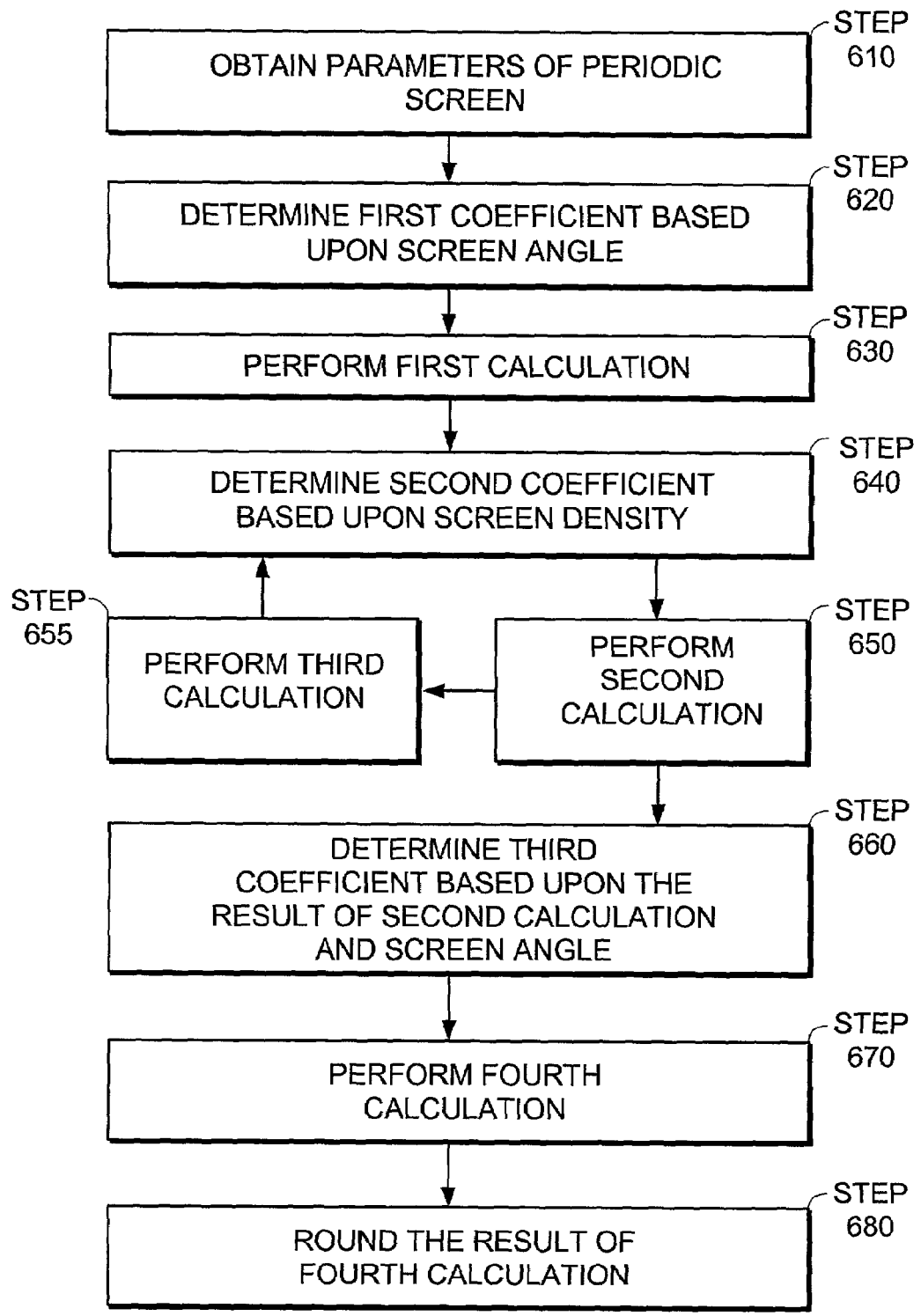
FIG. 6 shows a flowchart an embodiment of the descreening step shown in FIG. 3 for halftone images created using high- and medium-density screens.

Referring to FIG. 6, the descreening step according to a particular embodiment of the invention involves several substeps. First, the parameters of the periodic screen used to create the halftone image, including a screen cell dimension, screen angle, and line density, are obtained (STEP 610). In one embodiment, the screen parameters are provided by the RIP to the preproofer or the print drive as a part of a job description that includes the job name and a list of image files that made up the job.

In a particular embodiment of the invention the descreening technique makes use of information that is provided in the name of a job and/or file for an image. For example, the job name contains a string consisting of "@lpiTYPE/dpi" and the file name contains a known color name. For example, such a name might be "Job1@200ABS/2400 Black." The "recognized" "@lpiTYPE/dpi" strings include such strings as 200ABS/2400; 175ABS/2400; 150ABS/2400; and 114ACR/2400, where 200, 175, 150, and 114 refer to the screen rulings. The TYPE abbreviations include ABS (for Agfa Balanced Screening) and ACR (for Agfa CristalRaster Screening), respectively. The recognized color names strings in the file names are such strings as cyan; magenta; yellow; black; and pantone. The fact that the color names are recognized indicates that the screen angles used to produce these color separations can be determined.

In one embodiment, the screen cell dimension is determined by the ratio of the resolution of the screened image and the line density of the screen. For example, for a job with a name that includes the string 175ABS2400 in its name, the screen ruling is 175 lines per inch, and the resolution of the image is 2400 dpi. The screen cell dimension is determined by dividing the resolution (2400 dpi) by the screen ruling (175 lpi), which in this example equals about 3.71 dots. In another embodiment, the screen cell dimensions may be determined manually by measuring the pixel span across X number of halftone dots for each color plane and dividing that distance by X.

In the described embodiment, the screen angle can be determined by the information about the color separation contained in the color name string. For example, in case of Agfa Balanced Screening, the screen angle for the yellow color separation is 0 degrees, the screen angle for the cyan color separation is 15 degrees, the screen angle for the black color separation is 45 degrees, and the screen angle for the magenta color separation is 75 degrees. These screen angles are used for most screening techniques.

In one embodiment, the method for determining the optimal sample dimension vanes depending upon the screen cell dimension, the screen angle, and the line density of the screen. In principle, the sample area for each color separation may be at the same angular orientation as the screen used to create the source image data for this color separation (e.g. yellow=0 degrees, cyan=15 degrees, black=45 degrees, or magenta=75 degrees from the source pixel rows). This, however, is not practical as the time expenditures and computing overhead is unwieldy. Accordingly, in a particular embodiment of the invention, the source image data is sampled by a rectangular sample area with sides parallel to the rows and columns of the source image regardless of the angle associated with that color separation. The optimal sample dimension, however, may be different for each color separation, and can be determined, for example, as described below.

Figure 7A:
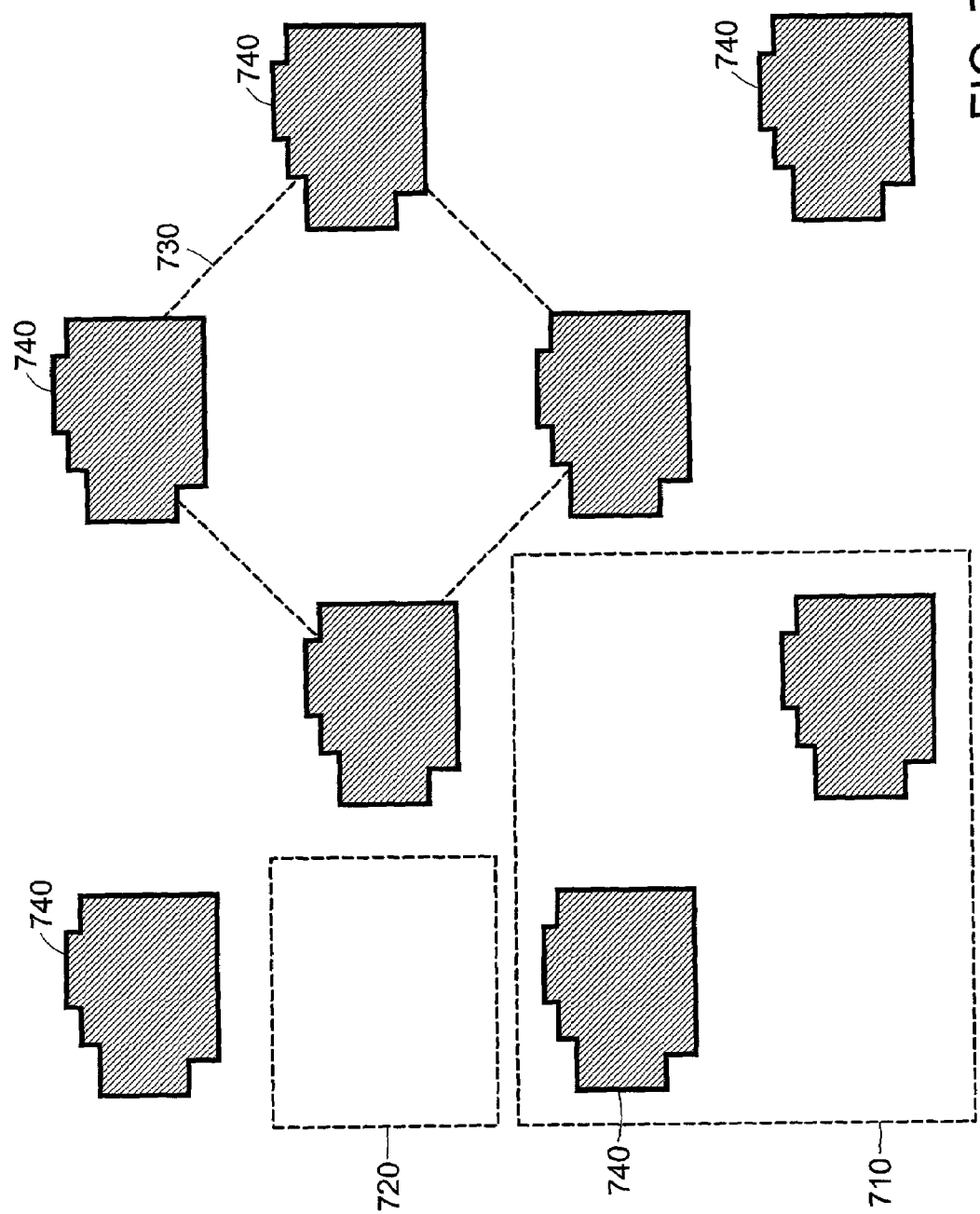
FIG. 7A shows the optimal sampling size derived according to the present invention.

Referring still to FIG. 6, in one embodiment, a method for determining an optimal sample dimension includes determining a first coefficient that depends upon the screen angle. For example, in a typical embodiment, the first coefficient is chosen based on whether the screen angle is one of 0, 15, or 75 degrees, or 45 degrees (STEP 620). As described above, a screen angle of 0 is typically associated with color yellow; a screen angle of 15 is typically associated with color cyan; a screen angle of 45 is typically associated with color black; and a screen angle of 75 is typically associated with color magenta. In one embodiment, if the screen angle is 0, 15, or 75 degrees, the first coefficient is selected to be 1.0. If the screen angle is 45 degrees, then the first coefficient is approximately the square root of 2, i.e. approximately 1.41. Thus, in the typical case, for the black separation, the coefficient will be different than for the other separations. As shown in FIG. 7A below, an increase of the sample dimension by a factor of the square root of 2 for a screen having a screen angle of 45 degrees results in the sample area that is twice the size of one halftone cell and therefore typically contains an integer number of halftone cells.

The method also includes performing a first calculation using the first coefficient (STEP 630). In one embodiment, this step includes multiplying the screen cell dimension by the first coefficient. The result of this calculation is further manipulated as part of this method.

The method further includes determining a second coefficient that depends upon the line density of the screen (STEP 640). In one embodiment, if the line density of the screen does not exceed a first predetermined line density value, then the second coefficient equals 1. If, however, the line density of the screen exceeds the first predetermined line density value, then the second coefficient represents the smallest integer that can be selected so that the resulting sample area includes at least a predetermined number of pixels. For example, in one embodiment, if the line density of the screen does not exceed 200 lpi, then the second coefficient equals 1. If the line density of the screen exceeds 200 lpi, then the second coefficient represents the smallest integer that can be selected so that the resulting sample area includes at least a predetermined number of pixels, for example, at least 100 pixels. In a particular embodiment, the predetermined number equals 128 pixels. In other embodiments, there can be multiple threshold line density levels, each with coefficient related to a minimum number of pixels.

The method also includes performing a second calculation using the result of the first calculation and the second coefficient (STEP 650). In one embodiment, the result of the first calculation (STEP 630) is multiplied by the second coefficient (that was chosen in STEP 640). In one embodiment, to obtain the value for the second coefficient, the method includes assuming that the second coefficient equals 1, performing the second calculation (STEP 650), and then performing a third calculation comprising raising the result of the second calculation to the second power (STEP 655). If the result of the third calculation is less than the predetermined number of pixels (e.g. 128 in the above example), the value of the second coefficient is increased by 1, and the second calculation STEP 650 and third calculation STEP 655 are repeated until the result of the third calculation exceeds the predetermined number of pixels (e.g. 128).

The method further includes determining a third coefficient that depends upon the result of the second calculation and the screen angle (STEP 660). In one embodiment, the third coefficient equals 1 if the screen angle is either 15, 45, or 75 degrees. If the screen angle is 0 degrees, then the third coefficient equals 1 if the fractional portion of the result of the second calculation is below 0.25 or above 0.75, otherwise the third coefficient equals 2. Thus, in the typical case, for certain results of the second calculation, the third coefficient for the yellow separation may be different from that for the other separations to reduce error associated with non-integer sample dimensions as further described below. The method further includes performing a fourth calculation comprising multiplying the result of the second calculation by the third coefficient (STEP 670).

The method concludes with rounding the result of the fourth calculation to the nearest integer to obtain the optimal sample dimension (STEP 680). The step of rounding the result of the fourth calculation is desirable because rounding of the result eliminates the computing overhead of calculating totals based on fractional pixels values. Rounding the result to the nearest integer reduces the relative error, which occurs when calculating the gray level.

Thus, in one embodiment, "medium" density screens (in which the screen density is below a predetermined value, for example 200 lpi), the optimal sample dimension for descreening is determined by calculating the original screen dimension from information provided with the original, as described above. For 0-degree screens, if the fractional portion of the original screen cell dimension is between 0.25 and 0.75, the optimal sample dimension is obtained by doubling the calculated screen cell dimension and rounding the result to the nearest integer. If the fractional portion of the original screen cell dimension is below 0.25 or above 0.75, the optimal sample dimension is obtained simply by rounding the calculated screen cell dimension to the nearest integer. For 15- and 75-degree screens, the screen cell dimension is rounded. For 45-degree screens, the screen cell dimension is multiplied by the square root of 2 and then rounded.

Referring to FIG. 7A, an increase of the 45-degree screen sample dimension by a factor of the square root of 2 typically results in a sample area 710 that is twice the "minimal" size of one halftone cell 720 and should therefore contain an integer number of halftone cells 730, because the sample square is too large to fall in the gaps between the halftone cells 730. As mentioned above, the preferred sample cell shape is square, as any other shape, such as, for example, diamond 740, may increase the software and computing overhead.

In some embodiments, the above determination of the optimal sample dimension for descreening for line screen densities exceeding a predetermined value, for example 200 lpi, is modified, because increased line density decreases the number of pixels in the image sample area. Because the image sample area contains fewer pixels, it generates fewer gray levels for the pixels of the resulting image, which leads to an undesirably higher minimal gray contrast. The higher gray contrast complicates color management and yields noticeable stepping when descreening objects of variable tone values, e.g. with smooth intensity increase.

Accordingly, in one variation of the embodiment of FIG. 6, the optimal sample dimension for screen densities exceeding 200 lpi is obtained by calculating the screen cell dimension from the data provided and then, for 0-, 15-, and 75-degree screens, in step 640, multiplying the screen cell dimension by the smallest integer selected such that the new sample area is at least some number of pixels N, or, for 45-degree screens, multiplying the screen cell dimension by the square root of two, and then, in step 640, multiplying the result by the smallest integer selected such that the new sample area is at least N pixels. Then, as described above, thusly modified screen cell dimension is rounded to the nearest integer, or, in case of 0-degree screens where the fractional portion of the modified screen cell dimension is between 0.25 and 0.75-doubling and then rounding it to the nearest integer.

To improve gray contrast of the proof, N should typically be greater than 100 for the black separation because the human eye is generally capable of detecting up to 100 separate grayscale values, i.e. is sensitive to changes in tone value larger than 1%. Although N may be slightly less than 100 for lighter color separation, i.e. yellow, cyan, and magenta, for efficiency of computations it is preferred to have a single value of N suitable for all color separations. At the same time, N should not be too large to minimize blurring of the image. In a particular embodiment, N is 128 pixels, although other values can be used.

As mentioned earlier, non-integer sample dimensions may present interference problems, especially with 0- and 45-degree screens. his is caused by the arrangement of halftone dots in the source image. After the sample dimension is rounded to the nearest integer, the extra row/column sampled (or omitted) is more likely to contain pixels of the same value, causing the value for the areas sampled to fluctuate. The zero degree halftone screen (typically-yellow) is most sensitive to imprecise sample dimensions.

For a given sample dimension the maximum error (in %), for the sample value is determined by Equation 1 below, where d is the halftone cell dimension and F is the closest integer value to d:

$$(|F|^2-d^2)/d^2 \qquad \text{(Equation 1)}$$

The value F is bounded as shown in Equation 2 below. Equation 2 represents the ratio of extra pixels per sample area to the optimal number of pixels per sample area.

$$d-0.5<=F<=d+0.5 \qquad \text{(Equation 2)}$$

Substituting for the maximum and minimum of F, yields Equation 3, which shows that, for large values of d, the maximum error is $|1/d|$.

$$((d\pm0.5)^2-d^2)/d^2=((d^2\pm d+0.25)-d^2)/d^2=(0.25\pm d)/d^2 \qquad \text{(Equation 3)}$$

Thus, to reduce error, the sample dimension must be increased in increments of the sample dimension. For example a 225 lpi screen at the resolution of 2400 dpi has a screen cell dimension of 10.67, and the expected error could be almost $|9\%|$. By doubling the sample dimension to 21.3, the error reduces to $|0.009\%|$. Errors of $|5\%|$ are typically not visible to the naked eye, especially after the image is error diffusion is performed for output to the proofing engine. Accordingly, as shown in step 680, in one embodiment, to reduce the error, the resulting sample dimension for the 0-degree screen angle is doubled when the result of the third second calculation is step 650 has a fractional portion falling between 0.25 and 0.75.

On the other hand, too large a sample dimension can cause blurring or "softening" of the resulting image. It is possible to sharpen the image by changing a pixel's value by a percentage of the difference between the pixel's value and the average of the neighboring pixels' values. Dark pixels surrounded by lighter pixels are made darker and vice versa. Due to oversampling of source pixels, however, this conventional technique has little effect.

Figure 7B:
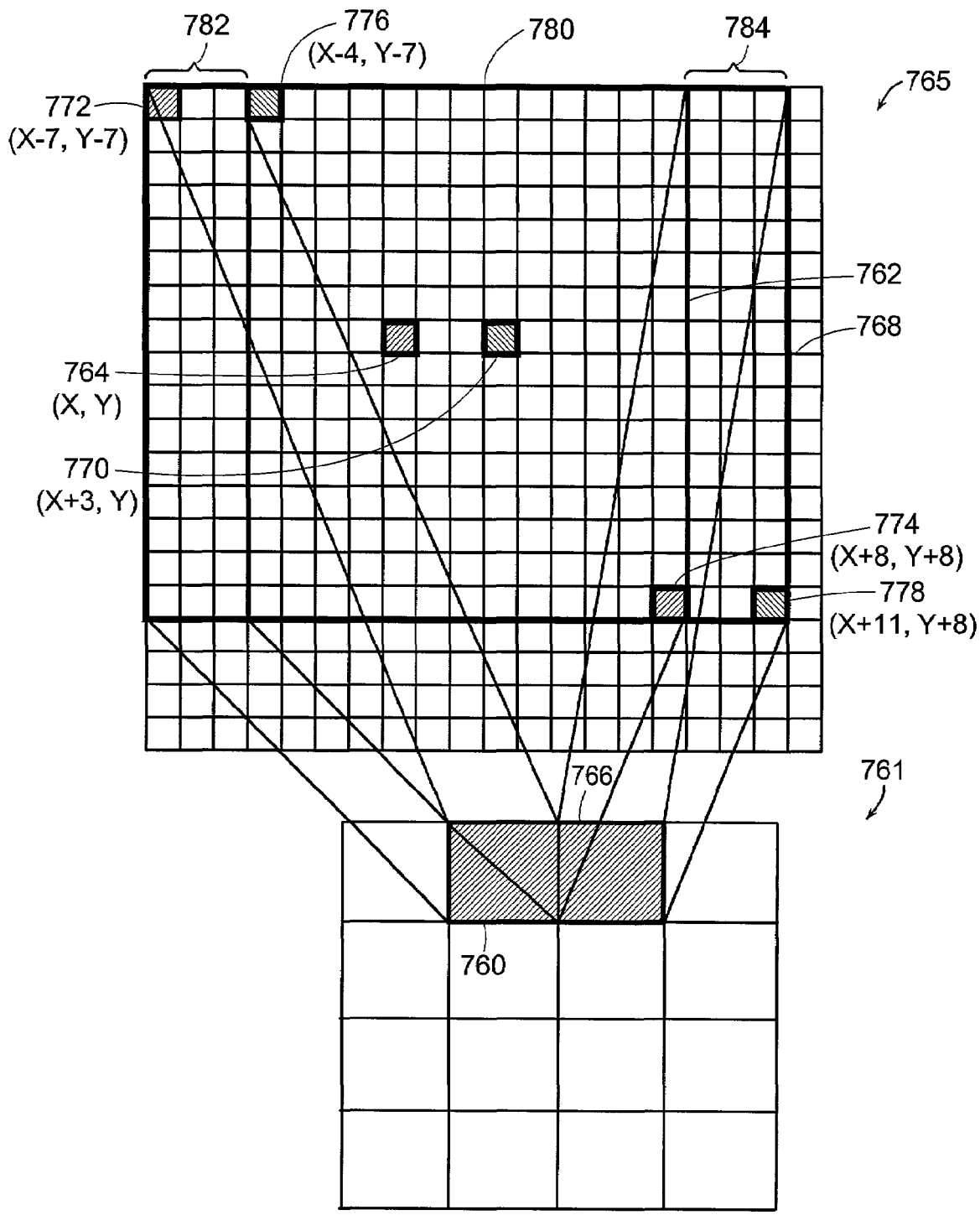
FIG. 7B shows the concept of "displaced neighborhood" derived according to the present invention.

Referring to FIG. 7B, in one embodiment, values in neighboring pixels are assigned using many of the same source pixels, because the centers of sample areas are typically only a small number of pixels apart. For example, when descreening the source image at 2400 dpi to a proof image at 720 dpi using resolution-based descreening, the center of the source image sample area might be 3×4 or 3×3 pixels, but the sample dimensions are much greater. For example, for the 15-degree screen with a density of 150 lpi and 2400 dpi resolution, the sample dimension is 16×16 pixels.

In the example above, a descreened pixel 760 of the proof image 761, whose source image sample area 762 is centered at a pixel 764 with coordinates (x,y) in the source image 765, has an immediate neighbor to its right 766 whose source image sample area 768 is centered at a pixel 770 with coordinates (x+3, y). To obtain the descreened value for the pixel 760, source pixels from an upper left pixel 772 with coordinates (x−7, y−7) to a lower right pixel 774 with coordinates (x+8, y+8) inclusive are used. Similarly, to obtain the descreened value for the pixel 766, source pixels from an upper left pixel 776 with coordinates (x−4, y−7) to a lower right pixel 778 with coordinates (x+11, y+8) inclusive, are used. The intersection of source pixels in both samples 780 is (x−4, y−7) to (x+8, y+8) or 13 columns of 16 pixels for a total of 208 source pixels. Thus, each sample uses 3 unique columns of 16 pixels (48 pixels), i.e. the left column 782 with coordinates (x−7, y−7) to (x−5, y+8) and the right column 784 with coordinates (x+9, y−7) to (x+11, y+8). In a different example, the neighbors were 4 pixels apart, there would be 192 (12 columns of 16) common & 64 (4 columns of 16) unique source pixels. Thus, the maximum variance in tone value the pixels 760 and 766 could have is limited by the number of their common source pixels. In two examples described herein, neighboring 16×16 samples are created using 192 to 208 common pixels and 48 to 64 unique pixels. With only 48 to 64 unique pixels, the pixels 760 and 766 can vary by only 18–25% in gray level.

Accordingly, in one embodiment, the concept of "neighboring" is redefined when over sampling is performed. A neighboring target pixel would be the closest pixel made of substantially all unique source pixels. Instead of a row/column offset by 1 pixel, an over-sampled "neighboring" pixel would have an offset D of:

$$D=\text{(sample dimension/(source resolution/target resolution))}$$

For example, in the case of an image screened using 150 lpi line screen at 2400 dpi resolution that is to be descreened and rescaled to 720 dpi resolution, the offset would be 4.8 (preferably rounded to 5 or truncated to 4). This increased offset between the given pixel and the neighboring pixels is referred to as a "displaced neighborhood," and the so chosen neighboring pixels are referred to as "displaced neighbors."

Additionally, in some embodiments, an edge search is used to search and repair blurred rules and edges of text and solid objects. This is typically used most effectively with black and spot colors. Comparing immediate descreened neighboring pixels for variations is typically not helpful to repair blurred rules and edges of text and solid objects, because to accomplish such edge sharpening one needs to know how abutting sample areas in the source image may differ. Examining blocks of 1 bit data in the high-resolution source image, however, is generally impractical because of the computing overhead. Instead, in one embodiment, a descreened pixel in question is compared with some of its surrounding descreened pixels, but not with those immediately adjacent to it. In one embodiment, the search uses the concept of the "displaced neighborhood," described above.

For example, for the cyan color separation of the source image at 2400 dpi screened using a 15-degree line screen with the density of 150 lpi and descreened to 600 dpi, D equals $|(16/(2400/600))|$ 4 pixels. Thus, comparisons of a descreened pixel to its neighbors will use a displacement of $(|4|,|4|)$. The centers of the source sample areas of these pixels, which are 16 pixels apart; represent the closest sample areas with no common pixels. During the edge search, if a non-white pixel is found whose diagonal neighbors (or a pair of adjoining diagonal neighbors) are substantially white or turned-off and whose orthogonal neighbors are non-white, it is deemed a possible rule element. Such pixels are marked for resampling using resolution-based descreening described above. The resampled value would replace the "blurred" oversampled value in the target image data.

The method for generating a descreened contone proof image shown in FIG. 6 also can be modified when the original contone image is screened using low-density periodic screens, for example screens with a density of less than about 133 lpi. In case of such a low-density screen, the sample area increases, which in turn decreases gray contrast. As described above, however, increased sample area leads to a higher level of blurring. Although above-mentioned image sharpening using displaced neighborhoods may improve the crispiness of the resulting image, it may be insufficient for sample dimensions exceeding 32 pixels.

Figure 8:
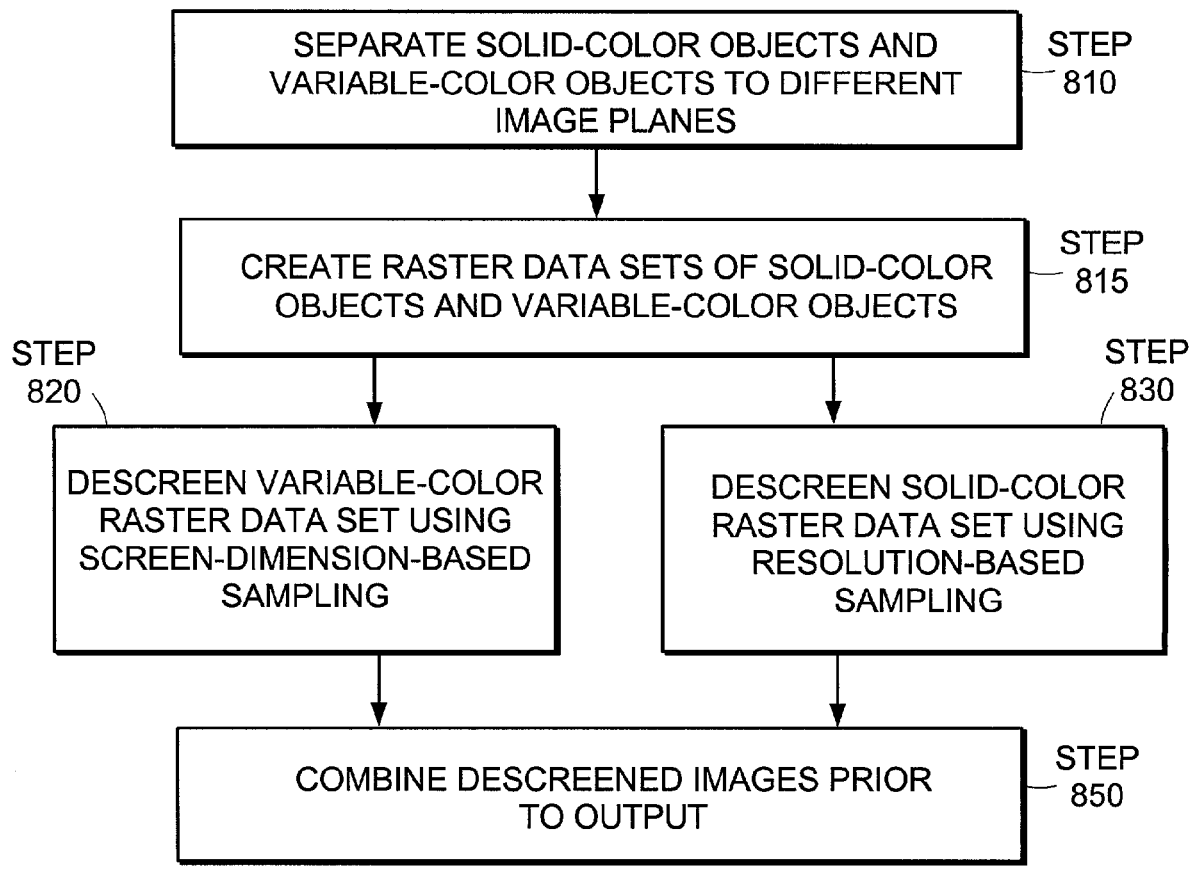
FIG. 8 shows a flowchart of an embodiment of the descreening step shown in FIG. 3 for halftone images created using low-density screens.

Referring to FIG. 8, this problem is addressed, in one embodiment, by taking advantage of a digital "double-burn" capability that allows for the the logical combination of color image planes. The digital doubleburn is described in U.S. patent application Ser. No. 09/089,861, now U.S. Pat. No. 6,295,133, which is incorporated herein by reference. Using this technique, a print drive is capable of combining raster data of two image planes of the same image prior to generating a proof or a final output.

In one such embodiment, solid-color objects, such as, for example, text and rules, are separated onto a different image plane than screened objects of variable color (STEP 810). This can be accomplished by a user at the front end by specifying unique color names for the objects that appear in the image. When the print job is submitted for rendering to the RIP, color planes having unique names are RIP-processed separately to generate two sets of high-resolution halftone image raster data, which are then stored on a print drive. Prior to the output to a high-resolution device, such as an imagesetter or a platesetter, these raster data sets are combined by the print drive into the final image plane. To generate a medium-resolution proof, however, the raster data sets representing solid-color objects ("Solid Set") and variable-color objects ("Variable Set") are descreened separately and combined by the print drive prior to the output to the proofer.

The Variable Set is descreened using the screen-dimension-based sampling method described above in connection with FIG. 6 (e.g. STEP 820). The Solid Set is decreened using the resolution-based descreening method described above in connection with FIG. 5A (STEP 830). The resulting 8-bit image data planes are be combined prior to the output to the proofer (STEP 840). The tone value of the resulting 8-bit pixel is either 255 or the sum of the corresponding pixels from the descreened Solid Set and Variable Set, whichever is less. As a result, smooth image having variable tone values and crisp solid objects can be produced for each target color separations.

Figure 9:
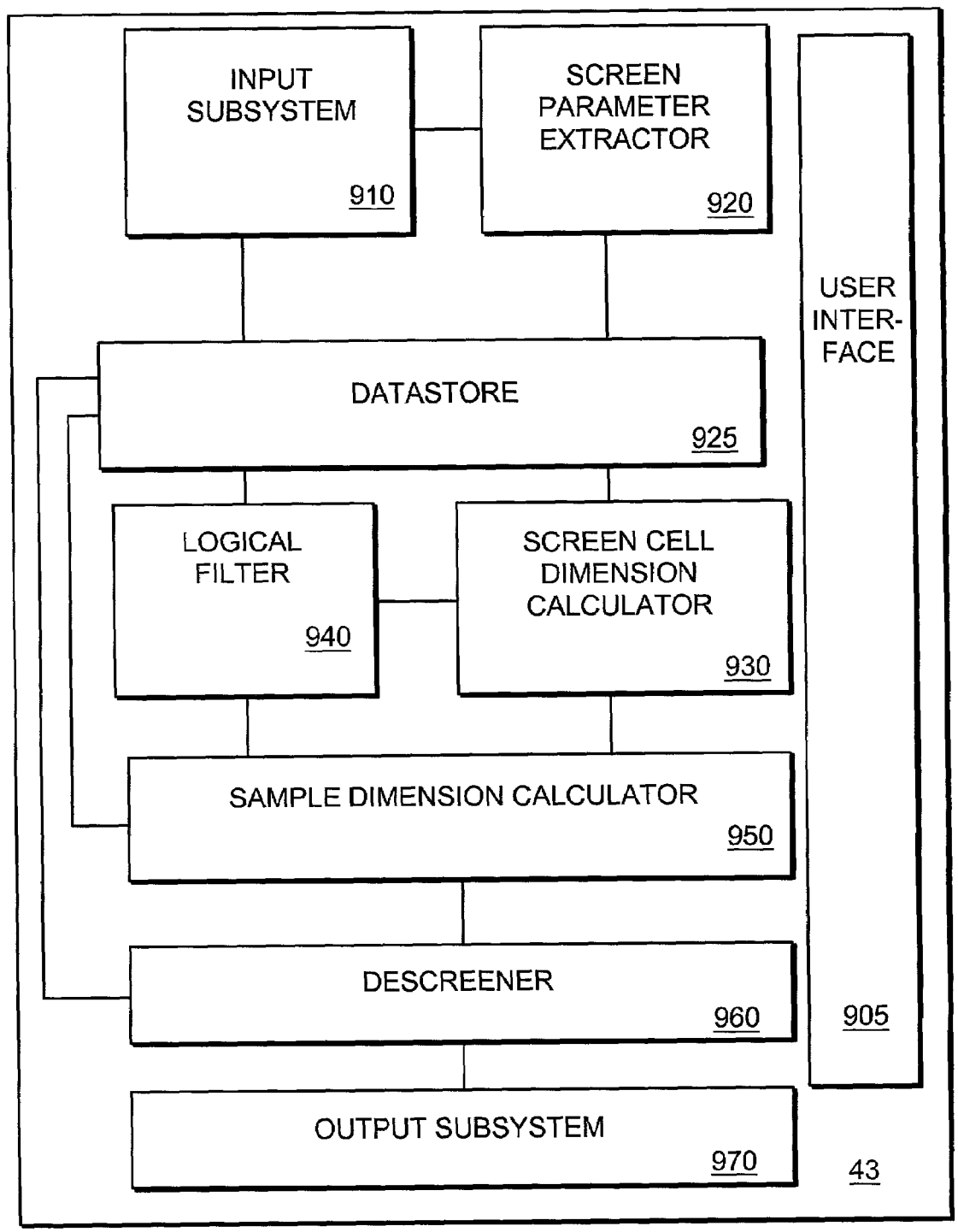
FIG. 9 shows a block diagram of the preproofer according to one embodiment of the invention.

Referring to FIG. 9, the preproofer 43 includes a user interface 905 for facilitating user control over the descreening process. The preproofer 43 also includes an input subsystem 910 for receiving raster data of at least one of the images of a print job. The preproofer 43 further includes the screen parameter extractor 920 for obtaining parameters of the periodic screen used to create the halftone raster image, including screen angle, image resolution and line density. In one embodiment, the screen parameters are provided by the RIP to the preproofer 43 as a part of a job description that includes the job name and a list of image files that made up the job. The preproofer 43 further includes a data store 925 wherein the extracted screen parameters are stored. The data store 925 is in communication with the input subsystem 910 and the screen parameter extractor 920.

The preeproofer 43 further includes a screen cell dimension calculator 930 connected to the data store 925 for calculating a screen cell dimension based upon parameters of the periodic screen used to create the halftone raster image obtained from the parameter extractor 920. In one embodiment, the screen cell dimension calculator 930 is implemented by software modules that perform the functionality described herein.

The preproofer 43 further includes a logical filter 940 connected to the screen parameter extractor 920 for controlling the calculation of the optimal sample dimension depending upon the parameters of the periodic screen. In one embodiment, the logical filter 940 is implemented by software modules that perform the functionality described herein.

The preproofer 43 further includes a sample dimension calculator 950 connected to the logical filter 940 and the data store 925 for calculating the optimal sample dimension depending upon the parameters of the periodic screen provided by the screen parameter extractor 920 and filtered by the logical filter 940. In one embodiment, the calculated optimal sample dimensions are stored in the data store 925 categorized by the screen tile name. In one embodiment, the sample dimension calculator 950 is implemented by software modules that perform the functionality described herein.

The preproofer 43 further includes a descreener 960 connected to the sample dimension calculator 950, the data store 925 and the input subsystem 910 for descreening the raster data using the optimal sample dimension calculated by the sample dimension calculator 950. In one embodiment, on output to a proofer, a user assigns a screen set to the job, so that the name of the job points to a screen tile name. A color suffix, such as, for example, C for cyan, M for magenta, Y for yellow, and K for black, is appended to the name of the screen set based on the color separation being descreened, so that the value of the optimal sample dimension may be retrieved from the data store 925. The descreener 960 may be implemented by software modules that perform the functionality described herein. The preproofer 43 may also include an output subsystem 970 for transmitting data to an output device, such as the proofer 68.

Referring still to FIG. 9, in one embodiment, the user can configure the preproofer 43. The configuration is accomplished via a user interface 905 available to the user on preproofer 43. The user interface 905 may also be available on another system in communication with preproofer 43 over the network 35. The configuration includes specification of directories that the preproofer 43 will use. The configuration includes the ability to add, delete, and modify spot color conversion profiles to specify how spot colors may be converted. Spot color conversion profiles specify CMYK equivalents to named spot colors. The configuration includes the ability to select a particular spot color conversion profile. The configuration includes specification of a specific spot color conversion database, to be used for a specific job. The configuration includes specification of a global spot color conversion database. The configuration includes the specification of a color link. The user may create a color link by selecting the final output color space profile, which is typically the CMYK profile for the press, and the proofing color space profile, which is the generic profile of the proofing device to be used. The user can enable or disable solid black enhancement. If enabled, solid black type is not rendered in cyan, magenta, and yellow, but is rendered in black. The configuration includes the ability to invert the image, and to reverse the direction of the image. The files for which the default directory can be specified are input image data (for example, input TIFF files) color links, page description language templates, and spot color databases.

The configuration includes specification of proofing modes and number of separations. In one embodiment, the proofing mode and number of separations choices include the following four options:

(1) Exactly one separation: black and white grayscale only;

(2) Two or more separations: process and spot colors in color;

(3) Two or more separations: process and spot colors in black and white grayscale; or (4) Two or more separations: process colors in black and white grayscale and spot colors in color.

The configuration includes specification of a descreening mode to specify the descreening resolution to be applied. In one embodiment, descreening is automatically applied to binary image data sets (for example TIFF files). The configuration includes specification of the output format. In one embodiment, the desired output format is set to either Postscript™ page description language or TIFF file format. The configuration includes specification of a Postscript™ template to use if the output is Postscript™. The configuration includes specification of output compression options, for example whether to use compression, and what type of compression to use. The configuration may include a specification of a default descreening resolution, for example to specify a default resolution of 150 dpi. In one embodiment, a job list is available for queuing preproofing jobs. The job list permits modifying, aborting, and clearing jobs in the queue.

In one embodiment, the preproofer 43 maintains a job log including the job name, the number of processing and spot raster data sets, the setup options, the time the preproofing operations start and complete each job, and the length of time it too to complete each job. Warnings and errors are also included in the log.

Figure 10:
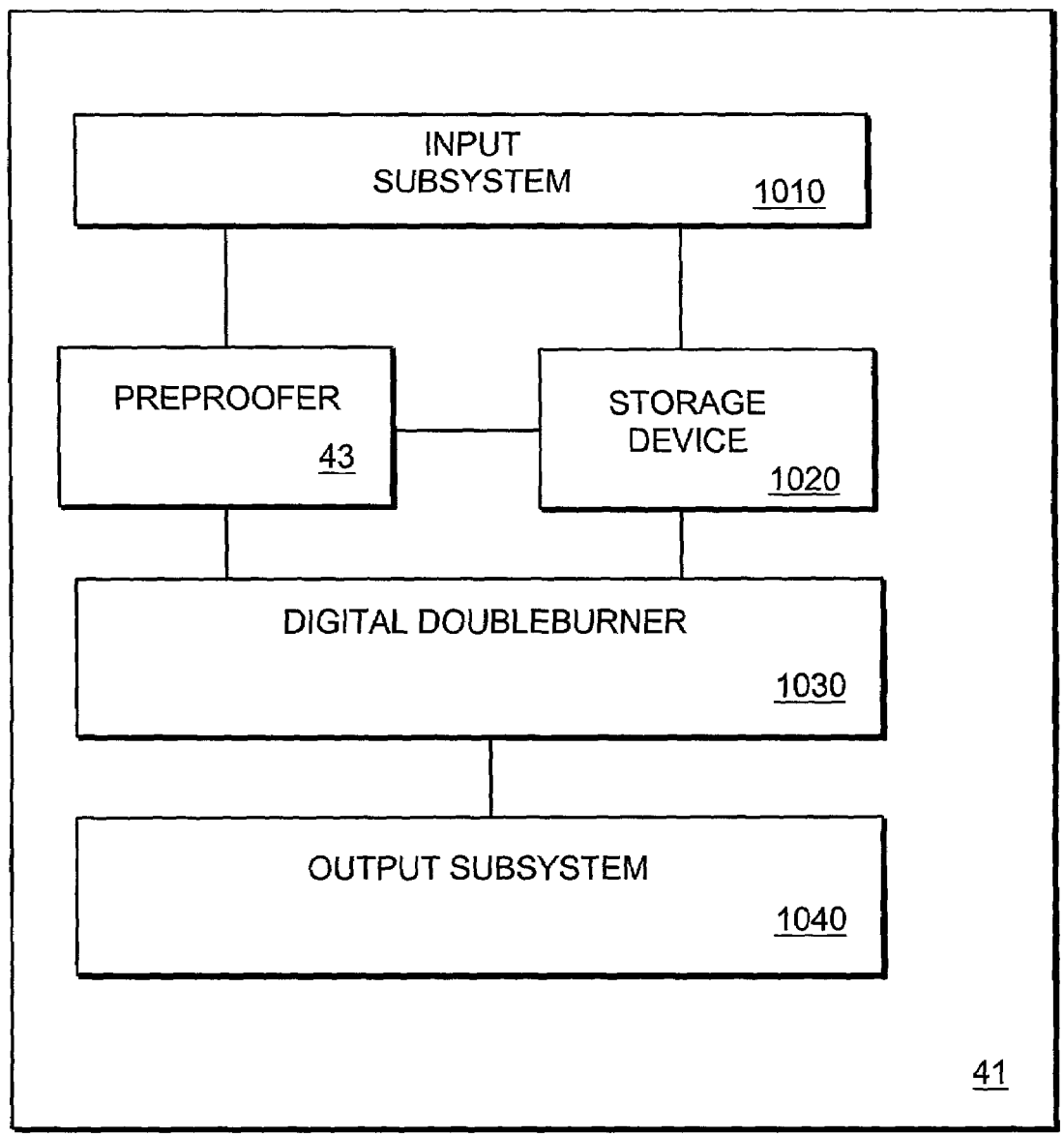
FIG. 10 shows a block diagram of the print drive according to one embodiment of the invention.

Referring to FIG. 10, the preproofer 43 can be implemented as part of the print drive 41. The print drive 41 includes the input subsystem 1010 for receiving raster data of at least one of the images of a print job from the RIP. In one embodiment, the input subsystem can be implemented with networking hardware and software that allows the print drive to receive raster data.

The print drive 41 may further include a storage device 1020 connected to the input subsystem 1010 and the preproofer 43. The storage device 1020 is capable of storing a plurality of the raster data sets. In one embodiment, the storage device 1020 is a combination of hardware, such as a hard disk, RAM memory, or some combination, and software for providing data storage functions.

The print drive 41 further includes a digital doubleburner 1030 connected to the storage device 1020 and the preproofer 43. The digital doubleburner 1030 is capable of combining image data sets of two image planes of the same image prior to generating a proof or a final output. In one embodiment, the digital doubleburner 1030 is implemented by software modules that perform the functionality described herein. In another embodiement, the digital doubleburner 1030 is implemented with some combination of hardware and software.

The print drive 41 may also include an output subsystem 1040 for transmitting data to an output device, such as the proofer 68. The output device 1040 maybe some combination of a network device (possibly even the same network device as the input subsystem) and software to interface with the network device. The output device 1040 may include hardware to interface directly with an output device.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

The invention claimed is:

1. A method for determining an optimal sample dimension suitable for descreening and rescaling the raster data of a halftone image, said halftone image converted from an original contone image using a periodic screen, the method comprising the steps of:
   (a) obtaining parameters of said periodic screen, said parameters comprising:
      a line density,
      a cell dimension, and
      a screen angle; and
   (b) modifying said cell dimension in response to said line density and said screen angle, thereby calculating said optimal sample dimension suitable for descreening said halftone image.

2. The method of claim 1 further comprising storing said optimal sample dimension.

3. The method of claim 2 further comprising descreening and rescaling said raster data using said optimal sample dimension.

4. The method of claim 1 wherein the step of modifying said cell dimension comprises:
   (a) performing a first calculation comprising multiplying said cell dimension by a first coefficient;
   (b) performing a second calculation comprising multiplying the result of said first calculation by a second coefficient;
   (c) performing a third calculation comprising raising the result of said second calculation to the second power;
   (d) performing a fourth calculation comprising multiplying the result of said second calculation by a third coefficient; and
   (e) rounding the result of said fourth calculation to the nearest integer.

5. The method of claim 4 wherein each of said first coefficient, said second coefficient; and said third coefficient equals 1.

6. The method of claim 4 wherein said first coefficient and said second coefficient equal 1, and said third coefficient equals 2.

7. The method of claim 4 wherein said first coefficient equals a square root of 2, and each of said second coefficient end said third coefficient equals 1.

8. The method of claim 4 wherein said first coefficient equals 1 and said second coefficient comprises the smallest integer selected such that the result of said third calculation exceeds a predetermined number of pixels.

9. The method of claim 8 wherein the predetermined number of pixels is at least 100.

10. The method of claim 9 wherein the predetermined number of pixels equals 128.

11. The method of claim 8 wherein said third coefficient equals 1.

12. The method of claim 8 wherein said third coefficient equals 2.

13. The method of claim 4 wherein said first coefficient equals a square root of 2, said second coefficient comprises a smallest integer selected such that the result of said third calculation exceeds a predetermined number of pixels, and said third coefficient equals 1.

14. The method of claim 13 wherein the predetermined number of pixels is at least 100.

15. The method of claim 14 wherein the predetermined number of pixels is 128.

16. A method for generating a descreened contone proof image; said descreened contone proof image accurately reflecting the layout of a halftone image converted from an original contone image using a high- or medium-density periodic screen, the method comprising:
(a) receiving at a print drive from at least one raster image processor the raster data of said halftone image processed by the at least one raster image processor, the print drive comprising a job control system for receiving, storing, digitally combining, and initiating output of raster data, and a user interface for directing operation of the job control system by a system operator;
(b) determining an optimal screen-based sample dimension suitable for descreening and rescaling said raster data of said halftone image comprising the steps of:
obtaining parameters of said periodic screen, said parameters comprising a cell dimension, and a screen angle; and modifying said cell dimension in response to said screen angle thereby calculating an optimal screen-based sample dimension;
(c) descreening and rescaling said raster data using said optimal screen-based sample dimension to obtain a descreened proof raster data set of said halftone image; and
(d) imaging said descreened proof raster data set on a proofer.

17. The method of claim 16 wherein the step of imaging said descreened proof raster data set on a proofer comprises the steps of:
(a) wrapping said descreened proof raster data set in a page description language wrapper; and
(b) transmitting said descreened proof raster data set wrapped in a page description language wrapper to said proofer.

18. A method for generating a descreened contone proof image; said descreened contone proof image accurately reflecting the layout of a halftone image converted from an original contone image using a low-density periodic screen, the method comprising:
(a) processing said halftone image by the at least one raster image processor to create a plurality of raster data sets representing sets of objects contained in said halftone image;
(b) receiving at a print drive from at least one raster image processor the first raster data of a first set of objects of said halftone image, the print drive comprising a job control system for receiving, storing, digitally combining, and initiating output of raster data, and a user interface for directing operation of the job control system by a system operator;
(c) receiving the second raster data of a second set of objects of said halftone image,
(d) facilitating selection of said first raster data and said second raster data via said user interface;
(e) determining an optimal screen-based sample dimension suitable for descreening and rescaling of said first raster data comprising the steps of:
(i) obtaining parameters of said periodic screen, said parameters comprising a cell dimension and a screen angle; and
(ii) modifying said cell dimension in response to said screen angle, thereby calculating said optimal screen-based sample dimension;
(f) determining an optimal resolution-based sample dimension suitable for descreening and rescaling of said second raster data;
(g) descreening and rescaling said first raster data using said optimal screen-based sample dimension to form a first descreened proof raster data of said first set of objects;

(h) descreening and rescaling said second raster data using said optimal resolution-based sample dimension to form a second descreened proof raster data of said second set of objects;
(i) digitally combining by said print drive, in response to direction received via said user interface, said first descreened proof raster data and said second descreened proof raster data to form combined proof raster data set representing a resultant proof image; and
(j) imaging said combined proof raster data set on a proofer.

19. The method of claim 18 wherein the step of imaging said combined proof raster data set on the proofer comprises the steps of
wrapping said combined proof raster data see in a page description language wrapper; and
transmitting said combined proof raster data set wrapped in the page description language wrapper to the proofer.

20. The method of claim 18 wherein the step of determining an optimal resolution-based sample dimension suitable for descreening and rescaling said second aster data of said second set of objects comprises:
(a) obtaining the resolution value of said halftone image;
(b) providing the resolution value of said descreened contone proof image; and
(c) rounding the resultant ratio of the resolution value of said halftone image to the resolution value of said descreened contone proof image to the nearest integer.

21. The method of claim 18 wherein said first set of objects represents at least one variable-color object of said original contone image.

22. The method of claim 18 wherein said second set of objects represents at least one solid-color object of said original contone image.

23. A prepress system for generating a descreened contone proof image; said descreened contone proof image accurately reflecting the layout of a halftone image converted from an original contone image using a periodic screen, said prepress system comprising:
(a) a front end comprising an imaging application for creating a contone image having one or more separations and for forming a description of the contone image in a page description language;
(b) at least one raster image processor for processing the description of said contone image in the page description language thereby converting said contone image into said halftone image by creating raster data sets for each color separation associated with said halftone image;
(c) a print drive for controlling operations in said prepress system, the print drive comprising:
(i) a print drive input terminal receiving, from said at least one raster image processor, said raster data for each color separation associated with said halftone image;
(ii) a job control system for receiving, stating, digitally combining, and initiating output of raster data,
(iii) a use interface for directing operation of the job control system by a system operator;
(iv) a preproofer for determining an optimal sample dimension for at least one of said raster data sets and for descreening, rescaling, resizing, and combining said at least one of said raster data sets using said optimal sample dimension to create a proofer raster data set, said proofer raster data set including the descreened, rescaled, resized, and combined at least one of said raster data sets; and
(d) a proofer for imaging said proofer raster data set.

24. The prepress system of claim 23 wherein said preproofer is capable of wrapping said proof raster data set in a page description language wrapper; and transmitting said proof raster data set wrapped in the page description language wrapper to the proofer.

25. The prepress system of claim 23, wherein the print drive further comprises a digital doubleburner in electrical communication with said print drive input terminal and said preproofer, said digital doubleburner capable of combining descreened proof raster data sets to form a combined proof raster data set representing a resultant proof image.

* * * * *